United States Patent
Zhong et al.

(10) Patent No.: US 12,328,499 B2
(45) Date of Patent: Jun. 10, 2025

(54) METHOD, CONTROL APPARATUS AND CONTROL SYSTEM FOR CONTROLLING AN IMAGE CAPTURE OF MOVABLE DEVICE

(71) Applicant: SZ DJI TECHNOLOGY CO., LTD., Shenzhen (CN)

(72) Inventors: Heli Zhong, Shenzhen (CN); Bingzhen Yang, Shenzhen (CN); Lifu Yu, Shenzhen (CN); Zhiyuan Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/398,918

(22) Filed: Dec. 28, 2023

(65) Prior Publication Data

US 2024/0179398 A1    May 30, 2024

Related U.S. Application Data

(63) Continuation of application No. 17/074,393, filed on Oct. 19, 2020, now Pat. No. 11,924,539, which is a
(Continued)

(51) Int. Cl.
*H04N 23/63* (2023.01)
*B64U 10/00* (2023.01)
(Continued)

(52) U.S. Cl.
CPC ......... *H04N 23/632* (2023.01); *G05D 1/0016* (2013.01); *G05D 1/0038* (2013.01);
(Continued)

(58) Field of Classification Search
CPC .... H04N 23/632; H04N 23/661; H04N 23/67; H04N 23/68; H04N 23/70; H04N 23/62;
(Continued)

(56) References Cited

U.S. PATENT DOCUMENTS

| 7,091,430 B1 | 8/2006 | Haizima et al. |
| 7,242,295 B1 | 7/2007 | Milinusic et al. |

(Continued)

FOREIGN PATENT DOCUMENTS

| CN | 201491134 U | 5/2010 |
| CN | 201945780 U | 8/2011 |

(Continued)

OTHER PUBLICATIONS

The World Intellectual Property Organization (WIPO) International Search Report for PCT/CN2015/085587 May 9, 2016 5 Pages.

*Primary Examiner* — Usman A Khan
(74) *Attorney, Agent, or Firm* — ANOVA LAW GROUP, PLLC

(57) ABSTRACT

A system for controlling image capture includes a control apparatus including a main body, a dial located in a slot of a sidewall of the main body with a portion of a cylindrical sidewall of the dial being exposed to be turned by a finger of a user, a memory storing a computer program code, and a processor configured to execute the computer program code to: receive, from a movable device, an image of a target imaging area, control a motion attitude of the movable device according to an operation on a joystick of the control apparatus by the user holding the control apparatus, and adjust an attitude of a gimbal device configured on the movable device according to an operation on the dial configured on the control apparatus by the user while controlling the motion attitude of the movable device.

20 Claims, 5 Drawing Sheets

Related U.S. Application Data continuation of application No. 15/883,883, filed on Jan. 30, 2018, now Pat. No. 10,809,716, which is a continuation of application No. PCT/CN2015/085587, filed on Jul. 30, 2015.

(51) Int. Cl.

| | | |
|---|---|---|
| *B64U 20/87* | (2023.01) | |
| *B64U 101/30* | (2023.01) | |
| *G05D 1/00* | (2024.01) | |
| *G05D 1/223* | (2024.01) | |
| *G05D 1/224* | (2024.01) | |
| *H04N 23/661* | (2023.01) | |
| *H04N 23/67* | (2023.01) | |
| *H04N 23/68* | (2023.01) | |

(52) U.S. Cl.
CPC .............. *G05D 1/223* (2024.01); *G05D 1/224* (2024.01); *H04N 23/661* (2023.01); *H04N 23/67* (2023.01); *H04N 23/68* (2023.01); *B64U 10/00* (2023.01); *B64U 20/87* (2023.01); *B64U 2101/30* (2023.01)

(58) Field of Classification Search
CPC .... H04N 23/631; H04N 23/64; H04N 23/667; H04N 23/695; H04N 23/66; G05D 1/0016; G05D 1/0038; G05D 1/223; G05D 1/224; B64U 10/00; B64U 20/87; B64U 2101/30; B64U 2201/20
USPC .................................................. 348/211.99
See application file for complete search history.

(56) References Cited

U.S. PATENT DOCUMENTS

| | | | |
|---|---|---|---|
| 2001/0038748 | A1 | 11/2001 | Onuki |
| 2005/0100087 | A1* | 5/2005 | Hasegawa ............. H04N 7/181 348/E7.086 |
| 2008/0198147 | A1 | 8/2008 | Hitosuga |
| 2008/0315840 | A1 | 12/2008 | Mori et al. |
| 2011/0102145 | A1* | 5/2011 | Park ....................... G06F 3/016 340/6.1 |
| 2012/0015686 | A1* | 1/2012 | Krupnik ............... G06F 3/0482 455/550.1 |
| 2012/0127319 | A1 | 5/2012 | Rao et al. |
| 2013/0010280 | A1 | 1/2013 | Palmieri et al. |
| 2013/0021475 | A1* | 1/2013 | Canant ................... H04N 23/20 348/E5.09 |
| 2013/0162832 | A1 | 6/2013 | Saijo |
| 2013/0176423 | A1* | 7/2013 | Rischmuller .......... A63H 27/12 348/114 |
| 2014/0168344 | A1 | 6/2014 | Shoemake et al. |
| 2016/0247115 | A1 | 8/2016 | Pons |
| 2016/0313732 | A1* | 10/2016 | Seydoux ............. G02B 27/0172 |
| 2022/0283637 | A1* | 9/2022 | Watanabe ............... G06F 3/011 |

FOREIGN PATENT DOCUMENTS

| | | |
|---|---|---|
| CN | 102196087 A | 9/2011 |
| CN | 102694980 A | 9/2012 |
| CN | 103426282 A | 12/2013 |
| CN | 103458189 A | 12/2013 |
| CN | 103916602 A | 7/2014 |
| CN | 104184947 A | 12/2014 |
| CN | 104317288 A | 1/2015 |

* cited by examiner

METHOD, CONTROL APPARATUS AND CONTROL SYSTEM FOR CONTROLLING AN IMAGE CAPTURE OF MOVABLE DEVICE

CROSS-REFERENCE TO RELATED APPLICATION

This application is a continuation application of U.S. patent application Ser. No. 17/074,393, filed on Oct. 19, 2020, which is a continuation application of U.S. patent application Ser. No. 15/883,883, filed on Jan. 30, 2018, now U.S. Pat. No. 10,809,716, issued on Oct. 20, 2020, which is a continuation application of International Application No. PCT/CN2015/085587, filed on Jul. 30, 2015, the entire contents of all of which are incorporated herein by reference.

TECHNICAL FIELD

The disclosure relates to image capture, and more particularly to a method, a control apparatus and a control system for controlling an image capture of a movable device.

BACKGROUND OF THE DISCLOSURE

Aerial photography can be effected by using an unmanned aerial vehicle (UAV) carrying an imaging apparatus as an aerial photography platform. With the rapid development of China's informatization construction in city mapping, land and forest exploration, environmental protection, security surveillance, energy monitoring, specific digital maps are increasingly demanded. A control module can be provided to an aerial photography UAV to avoid a "blind photography". For example, an image capture can be improved by regulating an attitude of the UAV or a gimbal in accordance with the captured images in real time. Various operations can be performed to an onboard camera before flying the UAV (e.g., powering on, adjusting a focal length, setting parameters, and starting a video recording). An image capture of the UAV can be controlled in UAV's flight. However, the UAV can be remote controlled in a limited range, leading an application of the UAV limited. There is a need to provide an aerial photography control system combined with easy operation, easy integration, long control range and high stability.

A stability in aerial photography can be a challenge. For instance, the aerial vehicles (e.g., including helicopters) can be subjected to a wind or an air turbulence. For instance, a ground operator may not control a flight attitude of an aircraft in real-time, and a camera gimbal operator may not regulate the camera gimbal in real-time. A non-real time manual regulation of the ground operator can result in a horizontal plane of a captured image below expectations. For instance, a flight direction and attitude of a helicopter and an attitude of the camera relative to the helicopter can be continuously adjusted in capturing a traditional aerial panoramic image, which complicates an operation of the ground operator controlling the helicopter and the operator controlling the camera gimbal. In other words, traditional ground 360-degree panoramic photography and aerial 360-degree panoramic photography can suffer from a limit and an uncertainty.

Existing control systems may fail to flexibly control and precisely adjust an imaging apparatus of flight device remotely, therefore an application of photography can be limited and a quality of photography can be inferior.

SUMMARY OF THE DISCLOSURE

The disclosure provides a method, a control apparatus and a control system for controlling an image capture of a movable device. A prior art problem in which a camera onboard a movable device is not manually and precisely adjustable during an image capture can be resolved.

A first aspect of the disclosure provides a method for controlling an image capture of a movable device. The method can comprise acquiring an image of a target imaging area from the movable device; adjusting, by a control apparatus, an imaging parameter with respect to the target imaging area; and sending, by the control apparatus, a first instruction carrying the adjusted imaging parameter to the movable device, such that the movable device captures an image of the target imaging area according to the first instruction.

On basis of the first aspect, in a first implementation of the first aspect, the control apparatus can comprise an interactive interface. The interactive interface can be displayed over an image of the target imaging area and comprise a focus icon and a light metering icon, the focus icon and the light metering icon being functional icons displayed on the interactive interface.

On basis of the first implementation of the first aspect, in a second implementation of the first aspect, subsequent to acquiring an image of a target imaging area from the movable device and prior to sending a first instruction carrying the adjusted imaging parameter to the movable device, the method can further comprise: detecting, by the control apparatus, a first touching signal indicating a user operating a non-icon area of the interactive interface; and simultaneously moving, by the control apparatus, the focus icon and the light metering icon to a first stopping position on the interactive interface according to the first touching signal. In some instances, the light metering icon can be a spot light metering icon. In some instances, adjusting, by a control apparatus, an imaging parameter with respect to the target imaging area can comprise performing, by the control apparatus, a focusing operation and a light metering operation to an area on the image which corresponds to the first stopping position, to obtain a focus parameter and an exposure parameter. In some instances, sending, by the control apparatus, the first instruction carrying the adjusted imaging parameter to the movable device can comprise sending, by the control apparatus, the first instruction carrying the focus parameter and the exposure parameter to the movable device, such that the movable device captures an image of the target imaging area according to the first instruction.

On basis of the second implementation of the first aspect, in a third implementation of the first aspect, obtaining the first stopping position of the focus icon and the light metering icon and performing a focusing operation and a light metering operation to an area on the image which corresponds to the first stopping position can comprise: when the focus icon is a manual focus icon and the light metering icon is a spot light metering icon corresponding to an automatic exposure function, performing, by the control apparatus, a manual focus processing to an area on the image which corresponds to the manual focus icon and performing, by the control apparatus, a spot light metering operation to an area on the image which corresponds to the spot light metering icon, to obtain the first focus parameter and the first exposure parameter. In some instances, sending, by the control apparatus, a first instruction carrying the adjusted imaging parameter to the movable device can comprise sending, by the control apparatus the first instruction carrying the first focus parameter and the first exposure parameter to the movable device, such that the movable device captures an image of the target imaging area according to the first instruction.

On basis of the second implementation of the first aspect, in a fourth implementation of the first aspect, obtaining the first stopping position of the focus icon and the light metering icon and performing a focusing operation and a light metering operation to an area on the image which corresponds to the first stopping position can comprise: when the focus icon is an automatic focus icon and the light metering icon is a spot light metering icon corresponding to an automatic exposure function, performing, by the control apparatus, an automatic focus processing to an area on the image which corresponds to the manual focus icon and performing, by the control apparatus, a spot light metering operation to an area on the image which corresponds to the spot light metering icon, to obtain a second focus parameter and a second exposure parameter. In some instances, sending, by the control apparatus, the first instruction carrying the adjusted imaging parameter to the movable device can comprise sending, by the control apparatus the first instruction carrying the second focus parameter and the second exposure parameter to the movable device, such that the movable device captures an image of the target imaging area according to the first instruction.

On basis of the second implementation of the first aspect, in a fifth implementation of the first aspect, obtaining the first stopping position of the focus icon and the light metering icon and performing a focusing operation and a light metering operation to an area on the image which corresponds to the first stopping position can comprise: when the focus icon is an automatic focus lock icon and the light metering icon is a spot light metering icon corresponding to an automatic exposure lock-on function, maintaining a position of the automatic focus icon and a position of the spot light metering icon on the interactive interface unchanged; and performing, by the control apparatus, an automatic focusing operation to an area on the image which corresponds to the automatic focus lock icon and performing a spot light metering operation to an area on the image which corresponds to the spot light metering icon, to obtain a third focus parameter and a third exposure parameter. In some instances, sending, by the control apparatus, the first instruction carrying the adjusted imaging parameter to the movable device can comprise sending, by the control apparatus the first instruction carrying the third focus parameter and the third exposure parameter to the movable device, such that the movable device captures an image of the target imaging area according to the first instruction.

On basis of the first aspect and any one of the first to fifth implementations of the first aspect, in a sixth implementation of the first aspect, the control apparatus can comprise an interactive interface. In some instances, subsequent to acquiring an image of a target imaging area from the movable device and prior to sending a first instruction carrying the adjusted imaging parameter to the movable device, the method can further comprise detecting, by the control apparatus, a second touching signal indicating a user operating a focus icon on the interactive interface. In some instances, adjusting, by a control apparatus, an imaging parameter with respect to the target imaging area can comprise performing, by the control apparatus, a focusing operation to the target imaging area according to the second touching signal.

On basis of the sixth implementation of the first aspect, in a seventh implementation of the first aspect, when the focus icon is an automatic focus icon, the method can further comprise switching, by the control apparatus, the automatic focus icon to an automatic focus lock icon. In some instances, performing, by the control apparatus, a focusing operation to the target imaging area according to the second touching signal can comprise performing, by the control apparatus, an automatic focusing operation to an area on the image which corresponds to the automatic focus lock icon according to the second touching signal. In some instances, when the focus icon is a manual focus icon, a state of the manual focus icon can be maintained unchanged. In some instances, performing, by the control apparatus, a focusing operation to the target imaging area according to the second touching signal can comprise the control apparatus performing a manual focusing operation to an area on the image which corresponds to the manual focus icon according to the second touching signal, magnifying the area on the image which corresponds to the manual focus icon, and determining whether the area on the image which corresponds to the manual focus icon is in focus as a result of the manual focusing operation.

On basis of the first aspect and any one of the first to seventh implementations of the first aspect, in an eighth implementation of the first aspect, the control apparatus can comprise an interactive interface. In some instances, subsequent to acquiring an image of a target imaging area from the movable device and prior to sending a first instruction carrying the adjusted imaging parameter to the movable device, the method can further comprise detecting, by the control apparatus, a third touching signal indicating a user operating a light metering icon on the interactive interface. In some instances, adjusting, by the control apparatus, an imaging parameter with respect to the target imaging area can comprise performing, by the control apparatus, a light metering operation to the target imaging area according to the third touching signal, to obtain a fourth exposure parameter. In some instances, sending, by the control apparatus, the first instruction carrying the adjusted imaging parameter to the movable device can comprise sending, by the control apparatus, the first instruction carrying the fourth exposure parameter to the movable device, such that the movable device captures an image of the target imaging area according to the first instruction.

On basis of the eighth implementation of the first aspect, in a ninth implementation of the first aspect, performing, by the control apparatus, a light metering operation to the target imaging area according to the third touching signal can comprise: when the light metering icon is a spot light metering icon, locking, by the control apparatus, the spot light metering icon to enable an automatic exposure lock function, and performing, by the control apparatus, a spot light metering operation to an area on the image which corresponds to the spot light metering icon according to the third touching signal; when the light metering icon is a locked spot light metering icon, unlocking, by the control apparatus, the locked spot light metering icon to switch to the spot light metering icon, and performing, by the control apparatus, a spot light metering operation to an area on the image which corresponds to the spot light metering icon according to the third touching signal; and when the light metering icon is a global light metering icon, performing, by the control apparatus, a global light metering operation to an area on the image which corresponds to the global light metering icon according to the third touching signal.

On basis of the first aspect and any one of the first to ninth implementations of the first aspect, in a tenth implementation of the first aspect, the control apparatus can comprise an interactive interface. In some instances, subsequent to acquiring an image of a target imaging area from the movable device and prior to sending a first instruction carrying the adjusted imaging parameter to the movable device, the method can further comprise detecting, by the control apparatus, a first sliding signal indicating a user operating a focus icon on the interactive interface. In some instances, the focus icon can include a manual focus icon and an automatic focus icon. In some instances, adjusting, by the control apparatus, an imaging parameter with respect to the target imaging area can comprise moving, by the control apparatus, the focus icon on the interactive interface according to the first sliding signal to obtain a third stopping position, and performing, by the control apparatus, a focusing operation to an area on the image which corresponds to the third stopping position to obtain a fourth focus parameter. In some instances, sending, by the control apparatus, a first instruction carrying the adjusted imaging parameter to the movable device can comprise sending, by the control apparatus, the first instruction carrying the fourth focus parameter to the movable device, such that the movable device captures an image of the target imaging area according to the first instruction.

On basis of the first aspect and any one of the first to tenth implementations of the first aspect, in an eleventh implementation of the first aspect, performing a focusing operation to an area on the image which corresponds to the third stopping position can comprise: when the focus icon is an automatic focus icon, performing, by the control apparatus, an automatic focusing operation to an area on the image which corresponds to the third stopping position, the fourth focus parameter being an automatic focus parameter; and when the focus icon is a manual focus icon, performing, by the control apparatus, a manual focusing operation to an area on the image which corresponds to the third stopping position, the fourth focus parameter being a manual parameter.

On basis of the first aspect and any one of the first to eleventh implementations of the first aspect, in a twelfth implementation of the first aspect, the control apparatus can comprise an interactive interface. In some instances, subsequent to acquiring an image of a target imaging area from the movable device and prior to sending a first instruction carrying the adjusted imaging parameter to the movable device, the method can further comprise detecting, by the control apparatus, a second sliding signal indicating a user operating a light metering icon on the interactive interface. In some instances, adjusting, by the control apparatus, an imaging parameter with respect to the target imaging area can comprise moving, by the control apparatus, the light metering icon on the interactive interface according to the second sliding signal to obtain a fourth stopping position, and performing, by the control apparatus, a light metering operation to an area on the image which corresponds to the fourth stopping position to obtain a fifth focus parameter. In some instances, sending, by the control apparatus, a first instruction carrying the adjusted imaging parameter to the movable device can comprise sending, by the control apparatus, the first instruction carrying the fifth focus parameter to the movable device, such that the movable device captures an image of the target imaging area according to the first instruction.

On basis of the twelfth implementation of the first aspect, in a thirteenth implementation of the first aspect, performing a light metering operation to an area on the image which corresponds to the fourth stopping position can comprise: when the light metering icon is a spot light metering icon, performing, by the control apparatus, a spot light metering operation to an area on the image which corresponds to the third stopping position; and when the light metering icon is a global light metering icon, performing, by the control apparatus, a global light metering operation to an area on the image which corresponds to the fourth stopping position.

On basis of the first aspect and any one of the first to thirteenth implementations of the first aspect, in a fourteenth implementation of the first aspect, subsequent to acquiring an image of a target imaging area from the movable device and prior to adjusting an imaging parameter with respect to the target imaging area, the method can further comprise: detecting, by the control apparatus, a fourth touching signal indicating a user operating a manual focus icon on the interactive interface, and switching the manual focus icon to the automatic focus icon according to the fourth touching signal; or detecting, by the control apparatus, a fifth touching signal indicating a user operating an automatic focus icon on the interactive interface, and switching the automatic focus icon to the manual focus icon according to the fifth touching signal.

On basis of the first aspect and any one of the first to fourteenth implementations of the first aspect, in a fifteenth implementation of the first aspect, subsequent to acquiring an image of a target imaging area from the movable device and prior to adjusting an imaging parameter with respect to the target imaging area, the method can further comprise: detecting, by the control apparatus, a sixth touching signal indicating a user operating an automatic exposure lock icon on the interactive interface, locking the spot light metering icon according to the sixth touching signal to enable an automatic exposure lock-on function, and enabling the automatic exposure lock icon on the interactive interface.

On basis of the first aspect and any one of the first to fourteenth implementations of the first aspect, in a sixteenth implementation of the first aspect, subsequent to acquiring an image of a target imaging area from the movable device and prior to adjusting an imaging parameter with respect to the target imaging area, the method can further comprise: detecting, by the control apparatus, a seventh touching signal indicating a user operating an automatic exposure lock icon on the interactive interface, switching the spot light metering icon to the automatic exposure lock icon according to the seventh touching signal, and unlocking the automatic exposure lock icon on the interactive interface.

On basis of the first aspect and any one of the first to sixteenth implementations of the first aspect, in a seventeenth implementation of the first aspect, subsequent to acquiring an image of a target imaging area from the movable device and prior to adjusting an imaging parameter with respect to the target imaging area, the method can further comprise: detecting, by the control apparatus, an eighth touching signal indicating a user operating an automatic focus lock general icon on the interactive interface, and unlocking the manual focus icon according to the eighth touching signal; and locking an automatic focus icon on the interactive interface according to the eighth touching signal to enable the automatic focus lock icon.

On basis of the first aspect and any one of the first to seventeenth implementations of the first aspect, in an eighteenth implementation of the first aspect, the interactive interface can comprise a movable device control icon. In some instances, the control apparatus can detect a ninth touching signal indicating a user operating the movable device control icon and adjusts an attitude of the movable device to acquire an updated image of the target imaging area from the movable device. In some instances, the control apparatus can adjust the imaging parameter with respect to the target imaging area, or maintain all or some of the imaging parameters unchanged. In some instances, the control apparatus can send a second instruction carrying the adjusted imaging parameter to the movable device, such that the movable device captures an image of the target imaging area according to the second instruction.

A second aspect of the disclosure provides a control apparatus for controlling an image capture of a movable device. The control apparatus can comprise: an acquiring module configured to acquire an image of a target imaging area from the movable device; a processing module configured to adjust an imaging parameter with respect to the target imaging area; a sending module configured to send a first instruction carrying the adjusted imaging parameter to the movable device, such that the movable device captures an image of the target imaging area according to the first instruction.

On basis of the second aspect and the first implementation of the second aspect, in a second implementation of the second aspect, the control apparatus can comprise an interactive interface. The interactive interface can be displayed over an image of the target imaging area and comprise a focus icon and a light metering icon, the focus icon and the light metering icon being functional icons displayed on the interactive interface.

On basis of the second implementation of the second aspect, in a third implementation of the second aspect, control apparatus can further comprise: a detecting module configured to detect a first touching signal indicating a user operating a non-icon area on the interactive interface; and a control module configured to simultaneously move the focus icon and the light metering icon to a first stopping position on the interactive interface according to the first touching signal detected by the detecting module, the light metering icon being a spot light metering icon, and control the processing module to perform a focusing operation and a light metering operation to an area on the image which corresponds to the first stopping position to obtain a focus parameter and an exposure parameter. In some instances, the sending module can be configured to send the first instruction carrying the focus parameter and the exposure parameter to the movable device, such that the movable device captures an image of the target imaging area according to the first instruction.

On basis of the second implementation of the second aspect, in a fourth implementation of the second aspect, the control module can be configured to, when the focus icon is a manual focus icon and the light metering icon is a spot light metering icon corresponding to an automatic exposure function, control the processing module to perform a manual focus processing to an area on the image which corresponds to the manual focus icon and perform a spot light metering operation to an area which corresponds to the spot light metering icon, to obtain the first focus parameter and the first exposure parameter. In some instances, the sending module can be configured to send the first instruction carrying the first focus parameter and the first exposure parameter to the movable device, such that the movable device captures an image of the target imaging area according to the first instruction.

On basis of the second implementation of the second aspect, in a fifth implementation of the second aspect, the control module can be configured to, when the focus icon is an automatic focus lock icon and the light metering icon is a spot light metering icon corresponding to an automatic exposure lock-on function, maintain a position of the automatic focus icon and a position of the spot light metering icon on the interactive interface unchanged, and control the processing module to perform an automatic focusing operation to an area on the image which corresponds to the automatic focus lock icon and perform a spot light metering operation to an area which corresponds to the spot light metering icon, to obtain a third focus parameter and a third exposure parameter. In some instances, the sending module can be configured to send the first instruction carrying the third focus parameter and the third exposure parameter to the movable device, such that the movable device captures an image of the target imaging area according to the first instruction.

On basis of any one of the second to fifth implementations of the second aspect, in a sixth implementation of the second aspect, the control apparatus can comprise an interactive interface. In some instances, the detecting module can be further configured to detect a second touching signal indicating a user operating a focus icon on the interactive interface. In some instances, the control module can be configured to control the processing module to perform a focusing operation to the target imaging area according to the second touching signal detected by the detecting module.

On basis of the sixth implementation of the second aspect, in a seventh implementation of the second aspect, when the focus icon is an automatic focus icon, the detecting module can be further configured to switch the automatic focus icon to an automatic focus lock icon. In some instances, the control module can be further configured to control the processing module to perform an automatic focusing operation to an area on the image which corresponds to the automatic focus lock icon according to the second touching signal. In some instances, when the focus icon is a manual focus icon, a state of the manual focus icon can be maintained unchanged, and the control module can be further configured to control the processing module to perform a manual focusing operation to an area on the image which corresponds to the manual focus icon according to the second touching signal, magnify the area on the image which corresponds to the manual focus icon and determine whether the area on the image which corresponds to the manual focus icon is in focus as a result of the manual focusing operation.

On basis of any one of the second to seventh implementations of the second aspect, in an eighth implementation of the second aspect, the control apparatus can comprise an interactive interface, and the detecting module can be further configured to detect a third touching signal indicating a user operating a light metering icon on the interactive interface. In some instances, the control module can be further configured to control the processing module to perform a light metering operation to the target imaging area according to the third touching signal, to obtain a fourth exposure parameter. In some instances, the sending module can be configured to send the first instruction carrying the fourth exposure parameter to the movable device, such that the movable device captures an image of the target imaging area according to the first instruction.

On basis of the eighth implementation of the second aspect, in a ninth implementation of the second aspect, the control module can be configured to: when the light metering icon is a spot light metering icon, lock the spot light metering icon to enable an automatic exposure lock function and control the processing module to perform a spot light metering operation to an area on the image which corresponds to the spot light metering icon according to the third touching signal; when the light metering icon is a locked spot light metering icon, unlock the locked spot light metering icon to switch to the spot light metering icon and control the processing module to perform a spot light metering operation to an area on the image which corresponds to the spot light metering icon according to the third touching signal; and when the light metering icon is a global light metering icon, control the processing module to perform a global light metering operation to an area on the image which corresponds to the global light metering icon according to the third touching signal.

On basis of any one of the second to ninth implementations of the second aspect, in a tenth implementation of the second aspect, the detecting module can be further configured to detect a first sliding signal indicating a user operating a focus icon on the interactive interface, the focus icon including a manual focus icon and an automatic focus icon. In some instances, the control module can be further configured to control the processing module to move the focus icon on the interactive interface according to the first sliding signal to obtain a third stopping position, and perform a focusing operation to an area on the image which corresponds to the third stopping position to obtain a fourth focus parameter. In some instances, the sending module can be further configured to send the first instruction carrying the fourth focus parameter to the movable device, such that the movable device captures an image of the target imaging area according to the first instruction.

On basis of the tenth implementation of the second aspect, in an eleventh implementation of the second aspect, the control module can be configured to, when the focus icon is an automatic focus icon, control the processing module to perform an automatic focusing operation to an area on the image which corresponds to the third stopping position, the fourth focus parameter being an automatic focus parameter, and when the focus icon is a manual focus icon, control the processing module to perform a manual focusing operation to an area on the image which corresponds to the third stopping position, the fourth focus parameter being a manual parameter.

On basis of any one of the second to eleventh implementations of the second aspect, in a twelfth implementation of the second aspect, the control apparatus can comprise an interactive interface, and the detecting module cam be further configured to detect a second sliding signal indicating a user operating a light metering icon on the interactive interface. In some instances, the control module can be further configured to control the processing module to move the light metering icon on the interactive interface according to the second sliding signal to obtain a fourth stopping position, and perform a light metering operation to an area on the image which corresponds to the fourth stopping position to obtain a fifth focus parameter. In some instances, the sending module can be configured to send the first instruction carrying the fifth focus parameter to the movable device, such that the movable device captures an image of the target imaging area according to the first instruction.

On basis of the twelfth implementation of the second aspect, in a thirteenth implementation of the second aspect, the control module can be configured to, when the light metering icon is a spot light metering icon, control the processing module to perform a spot light metering operation to an area on the image which corresponds to the third stopping position, and when the light metering icon is a global light metering icon, control the processing module to perform a global light metering operation to an area on the image which corresponds to the fourth stopping position.

On basis of any one of the second to thirteenth implementations of the second aspect, in a fourteenth implementation of the second aspect, the detecting module can be further configured to detect a fourth touching signal indicating a user operating a manual focus icon on the interactive interface. In some instances, the control module can be further configured to control the processing module to switch the manual focus icon to the automatic focus icon according to the fourth touching signal detected by the detecting module. Optionally, the detecting module can be further configured to detect a fifth touching signal indicating a user operating an automatic focus icon on the interactive interface. In some instances, the control module can be further configured to control the processing module to switch the automatic focus icon to the manual focus icon according to the fifth touching signal detected by the detecting module.

On basis of any one of the second to fourteenth implementations of the second aspect, in a fifteenth implementation of the second aspect, the detecting module can be further configured to detect a sixth touching signal indicating a user operating an automatic exposure lock icon on the interactive interface. In some instances, the control module can be further configured to control the processing module to lock the spot light metering icon according to the sixth touching signal detected by the detecting module to enable an automatic exposure lock-on function, and enable an automatic exposure lock icon on the interactive interface.

On basis of any one of the second to fifteenth implementations of the second aspect, in a sixteenth implementation of the second aspect, the detecting module can be further configured to detect a seventh touching signal indicating a user operating an automatic exposure lock icon on the interactive interface. In some instances, the control module can be further configured to control the processing module to switch the spot light metering icon to an automatic exposure lock icon according to the seventh touching signal detected by the detecting module, and unlock the automatic exposure lock icon on the interactive interface.

On basis of any one of the second to sixteenth implementations of the second aspect, in a seventeenth implementation of the second aspect, the detecting module can be further configured to detect an eighth touching signal indicating a user operating an automatic focus lock general icon on the interactive interface, and unlock the manual focus icon according to the eighth touching signal. In some instances, the control module can be further configured to lock an automatic focus icon on the interactive interface according to the eighth touching signal to enable the automatic focus lock icon.

On basis of any one of the second to seventeenth implementations of the second aspect, in an eighteenth implementation of the second aspect, the interactive interface can comprise a movable device control icon. In some instances, the control apparatus can be further configured to detect a ninth touching signal indicating a user operating the movable device control icon and adjust an attitude of the movable device to acquire an updated image of the target imaging area from the movable device. In some instances, the control module can be further configured to adjust an imaging parameter with respect to the target imaging area, or maintain all or some of the imaging parameters unchanged.

In some instances, the sending module can be further configured to send a second instruction carrying the adjusted imaging parameter to the movable device, such that the movable device captures an image of the target imaging area according to the second instruction.

A third aspect of the disclosure provides a method for controlling an image capture of a movable device. The method can comprise: acquiring an image of a target imaging area from the movable device; adjusting, by a first control apparatus and a second control apparatus, an imaging parameter with respect to the target imaging area; and sending, by the first control apparatus and/or the second control apparatus, a first instruction carrying the adjusted imaging parameter to the movable device, such that the movable device captures an image of the target imaging area according to the first instruction.

On basis of the third aspect, in a first implementation of the third aspect, the first control apparatus can comprise at least one of a dial, a joystick or a button. In some instances, the method can further comprise turning the dial to select a target adjustable mode, pressing the button to select a target adjustable mode or operating the joystick to select a target adjustable mode.

On basis of the first implementation of the third aspect, in a second implementation of the third aspect, the target adjustable mode can comprise one of a program control mode, an aperture priority mode, a shutter priority mode and a manual mode. In some instances, the method can further comprise, after selecting the target adjustable mode, adjusting at least one of an ISO sensitivity value, a shutter value, an aperture value and an exposure value using the dial.

On basis of the first implementation of the third aspect, in a third implementation of the third aspect, the target adjustable mode can be a manual focus mode. In some instances, the method can further comprise, after selecting the manual focus mode, performing a focusing operation to the image by turning the dial, and/or performing a manual focusing operation by operating a first scrollbar or a first function menu on an interactive interface of the second control apparatus. In some instances, the first scrollbar and the first function menu can correspond to a focus parameter.

On basis of the third aspect or the first implementation of the third aspect, in a fourth implementation of the third aspect, the method can further comprise enabling at least one of a light metering operation, an automatic focusing operation or an a manual focusing operation by operating the dial, the joystick or the button; enabling a light metering operation and/or an automatic focusing operation by touching an interactive interface of the second control apparatus; enabling a light metering operation and/or a manual focusing operation by touching an interactive interface of the second control apparatus; enabling an automatic focusing operation or an automatic focusing lock operation by touching an interactive interface of the second control apparatus; enabling an automatic exposure operation or an automatic exposure lock operation by touching an interactive interface of the second control apparatus; or enabling a spot light metering operation or a global light metering operation by touching an interactive interface of the second control apparatus.

On basis of the third aspect or any one of the first to fourth implementations of the third aspect, in a fifth implementation of the third aspect, the method can further comprise pressing a button on the second control apparatus to switch a shooting mode; touching a second scrollbar on an interactive interface of the second control apparatus to switch a shooting mode, the second scrollbar corresponding to an shooting mode; or touching a second function menu on an interactive interface of the second control apparatus to switch a shooting mode, the second function menu corresponding to an shooting mode. In some instances, the shooting mode can comprise a program automatic mode, an aperture priority mode, a shutter priority mode and a manual mode.

On basis of the fourth or fifth implementation of the third aspect, in a sixth implementation of the third aspect, when performing a manual focusing operation by operating a first scrollbar or a first function menu on an interactive interface of the second control apparatus, the method can further comprise: magnifying an area on the image to which the manual focusing operation is performed, and determining whether the area is in focus as a result of the manual focusing operation; and performing a focusing operation to the target imaging area by turning the dial and adjusting a light metering parameter on the interactive interface if the area is not in focus.

On basis of the third aspect or any one of the first to sixth implementations of the third aspect, in a seventh implementation of the third aspect, the interactive interface can comprise a movable device control icon. In some instances, the method can further comprise adjusting, by the first control apparatus, an attitude of the movable device to acquire an updated image of the target imaging area from the movable device.

On basis of the seventh implementation of the third aspect, in an eighth implementation of the third aspect, the method can further comprise: adjusting, by the first control apparatus and/or the second control apparatus, an imaging parameter with respect to the target imaging area; and sending, by the first control apparatus and/or the second control apparatus, a second instruction carrying the adjusted imaging parameter to the movable device, such that the movable device captures an image of the target imaging area according to the second instruction.

On basis of the seventh implementation of the third aspect, in a ninth implementation of the third aspect, the method can further comprise: maintaining, by the first control apparatus and/or the second control apparatus, all or some of the imaging parameters with respect to the target imaging area unchanged; and sending, by the first control apparatus and/or the second control apparatus, a second instruction carrying the adjusted imaging parameter to the movable device, such that the movable device captures an image of the target imaging area according to the second instruction.

A forth aspect of the disclosure provides a control system for controlling an image capture of a movable device. The control system can comprise a first control apparatus and a second control apparatus. In some instances, the first control apparatus and the second control apparatus can be configured to acquire an image of a target imaging area from the movable device, and adjust an imaging parameter with respect to the target imaging area respectively. In some instances, the first control apparatus and/or the second control apparatus can be configured to send a first instruction carrying the adjusted imaging parameter to the movable device, such that the movable device captures an image of the target imaging area according to the first instruction.

On basis of the fourth aspect, in a first implementation of the fourth aspect, the first control apparatus can comprise at least one of a dial, a joystick or a first button. In some instances, a target adjustable mode can be switched if the dial is turned. Optionally, a target adjustable mode can be switched if the first button is pressed and the first control apparatus receives a press instruction from the first button. Optionally, a target adjustable mode can be switched if the joystick is operated.

On basis of the first implementation of the fourth aspect, in a second implementation of the fourth aspect, the target adjustable mode can comprise one of a program control mode, an aperture priority mode, a shutter priority mode and a manual mode. In some instances, after selecting the target adjustable mode, the dial can be turned to adjust at least one of an ISO sensitivity value, a shutter value, an aperture value and an exposure value.

On basis of the fourth aspect, in a third implementation of the fourth aspect, the target adjustable mode can be a manual focus mode. In some instances, the dial can be configured to, after selecting the manual focus mode, perform a focusing operation to the image by turning the dial, and/or the second control apparatus comprises a processor and an interactive interface, the processor being configured to perform a manual focusing operation by operating a first scrollbar or a first function menu on the interactive interface of the second control apparatus, the first scrollbar and the first function menu corresponding to a focus parameter.

On basis of any one of the first to third implementations of the fourth aspect, in a fourth implementation of the fourth aspect, the first control apparatus can enable at least one of a light metering operation, an automatic focusing operation or an a manual focusing operation by operating the dial, the joystick or the first button. Optionally, the second control apparatus can comprise a processor and an interactive interface, the processor being configured to, according to a received touching signal with respect to the interactive interface, enable at least one of: a light metering operation and/or an automatic focusing operation; a light metering operation and/or a manual focusing operation; an automatic focusing operation or an automatic focusing lock operation; an automatic exposure operation or an automatic exposure lock operation; or a spot light metering operation or a global light metering operation.

On basis of the fourth implementation of the fourth aspect, in a fifth implementation of the fourth aspect, the second control apparatus can further comprise a second button. In some instances, the interactive interface can comprise a second scrollbar corresponding to a shooting mode and a second function menu corresponding to a shooting mode. In some instances, the processor can be further configured to perform one of: switching a shooting mode by receiving a press instruction from the second button; switching a shooting mode by detecting a touching signal with respect to the second scrollbar; and switching a shooting mode by detecting a touching signal with respect to the second function menu. In some instances, the shooting mode can comprise a program automatic mode, an aperture priority mode, a shutter priority mode and a manual mode.

On basis of the fourth or fifth implementation of the fourth aspect, in a sixth implementation of the fourth aspect, the processor can be further configured to: magnify an area on the image to which the manual focusing operation is performed, and determine whether the area is in focus as a result of the manual focusing operation; and perform a focusing operation to the target imaging area by turning the dial and adjust a light metering parameter on an interactive interface if the area is not in focus.

On basis of any one of the third to sixth implementations of the fourth aspect, in a seventh implementation of the fourth aspect, the interactive interface can comprise a movable device control icon. In some instances, the first control apparatus can be configured to adjust an attitude of the movable device to acquire an updated image of the target imaging area by the movable device.

On basis of the seventh implementation of the fourth aspect, in an eighth implementation of the fourth aspect, the first control apparatus and/or the second control apparatus can be configured to adjust an imaging parameter with respect to the target imaging area. In some instances, the first control apparatus and/or the second control apparatus can be configured to send a second instruction carrying the adjusted imaging parameter to the movable device, such that the movable device captures an image of the target imaging area according to the second instruction.

On basis of the eighth implementation of the fourth aspect, in a ninth implementation of the fourth aspect, one of the first control apparatus and the second control apparatus can be configured to maintain all or some of the imaging parameters with respect to the target imaging area unchanged. In some instances, one of the first control apparatus and the second control apparatus can be configured to send a second instruction carrying the adjusted imaging parameter to the movable device, such that the movable device captures an image of the target imaging area according to the second instruction.

With the technical solution of the disclosure, the control apparatus can adjust an imaging parameter with respect to the target imaging area, and send a first instruction carrying the adjusted imaging parameter to the movable device, such that the movable device can capture an image of the target imaging area according to the first instruction. Thereby, The imaging parameter of the imaging apparatus onboard the movable device can be remotely controlled and adjusted in real time in capturing an image.

DETAILED DESCRIPTION OF THE DISCLOSURE

Figure 1A:
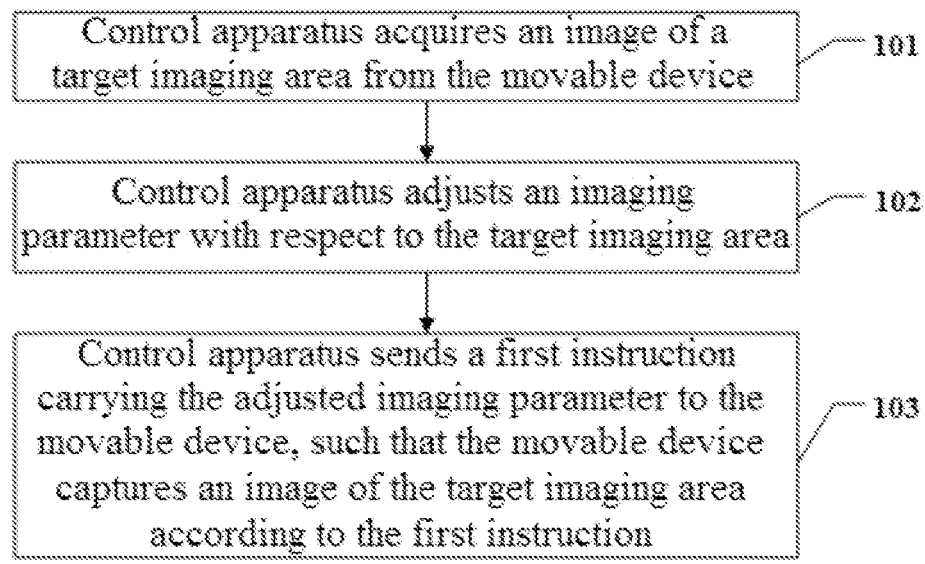
FIG. 1A shows a flowchart of a method for controlling an image capture of a movable device in accordance with an embodiment of the disclosure.

A better understanding of the disclosure will be obtained by reference to the following detailed description that sets forth illustrative embodiments with reference to the drawings. It will be apparent that, the embodiments described herein are merely provided by way of example only. Those skilled in the art can conceive other embodiments in light of those embodiments disclosed herein without inventive efforts, and all these embodiments are within the scope of the disclosure.

The terms "first", "second" and the like used in the specification, the claims and the foregoing figures of the disclosure are used to distinguishing similar objects, rather than describing a specific sequence or precedence order. It will be appreciated terms used as such may interchange where appropriate, so that the embodiments described herein can be implemented in other order than the content depicted or described herein. In addition, the terms "include", "have" and their variants are intended to cover non-exclusive inclusion, for example, processes, methods, systems, products or devices including a series of steps or modules are not limited to those steps or modules enumerated clearly, but may include other steps or modules that are not enumerated clearly or that are intrinsic to these processes, methods, products or devices. The division of modules as mentioned in this disclosure is merely logical division, and in real applications there may exist further division methods, for example, multiple modules may be combined into or integrated on another system. Or some features may be ignored or not be performed. In addition, the mutual coupling or direct coupling or communicative connection as displayed or discussed may be via some interfaces, indirect coupling or communicative connection between modules may take an electrical or other similar form. The disclosure is not intended to make limitations in this regard. Moreover, modules or sub-modules illustrated as separate components may be or may not be physically separate, may be or may not be physical modules, or may be distributed over multiple circuit modules. The objectives of the embodiments of the disclosure may be accomplished by selecting part of or all modules according to actual needs.

Embodiments of the disclosure provide a method, a control apparatus and a control system for controlling an image capture of a movable device. The method, control apparatus and control system can be used with unmanned aerial vehicles (UAVs) to resolve a prior art problem in which a camera onboard a movable device is not manually and precisely adjustable during an image capture. The movable device as discussed in the embodiments of the disclosure can be a robot, a UAV, an automotive or a device capable of flying which carries an imaging apparatus. The method of the disclosure can be used with an object moving at a high velocity. The disclosure is not intended to make any limitation in this regard.

The method of the disclosure can be used with an aerial vehicle carrying an imaging apparatus to capture aerial images and observe traffic conditions. For instance, the imaging apparatus can be a digital camera or a digital single-lens reflex camera. The method of the disclosure can be particularly suitable for a digital single-lens reflex camera). As shown in FIG. 1D, 1031 can denote an aerial vehicle, 1032 can denote a control gimbal, and 1033 can denote an imaging apparatus. The method of the disclosure can also be used in a gaming or a simulation software of image capture. The disclosure is not intended to limit a specific application scenario.

Figure 1B:
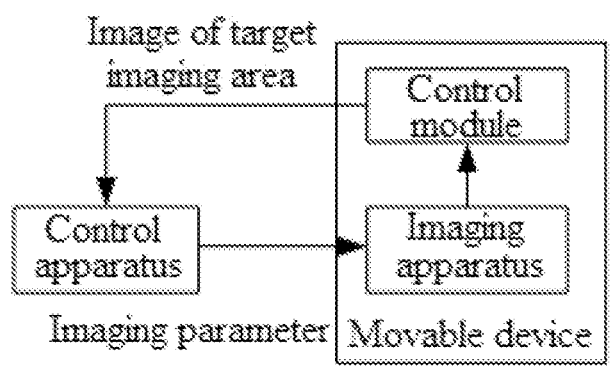
FIG. 1B shows a flowchart of an interaction between a control apparatus and a movable device in accordance with an embodiment of the disclosure.

Referring to FIG. 1A and FIG. 1B, a method for controlling an image capture of a movable device in accordance with an embodiment of the disclosure is illustrated from the control apparatus prospective. In some instances, the control apparatus can be a remote controller, an intelligent terminal or application software embedded in an intelligent terminal. The disclosure is not intended to make limitation in this regard. In some embodiments, the method can comprise steps 101 to 103.

In step 101, an image of a target imaging area can be acquired from the movable device.

In step 102, an imaging parameter with respect to the target imaging area can be adjusted by the control apparatus.

In step 103, a first instruction carrying the adjusted imaging parameter can be sent by the control apparatus to the movable device, such that the movable device can capture an image of the target imaging area according to the first instruction.

In embodiments of the disclosure, the control apparatus can adjust an imaging parameter with respect to the target imaging area, and send a first instruction carrying the adjusted imaging parameter to the movable device, such that the movable device can capture an image of the target imaging area according to the first instruction. Thereby, the imaging parameter of the imaging apparatus onboard the movable device can be remotely controlled and adjusted in real time in capturing an image.

Figure 1C:
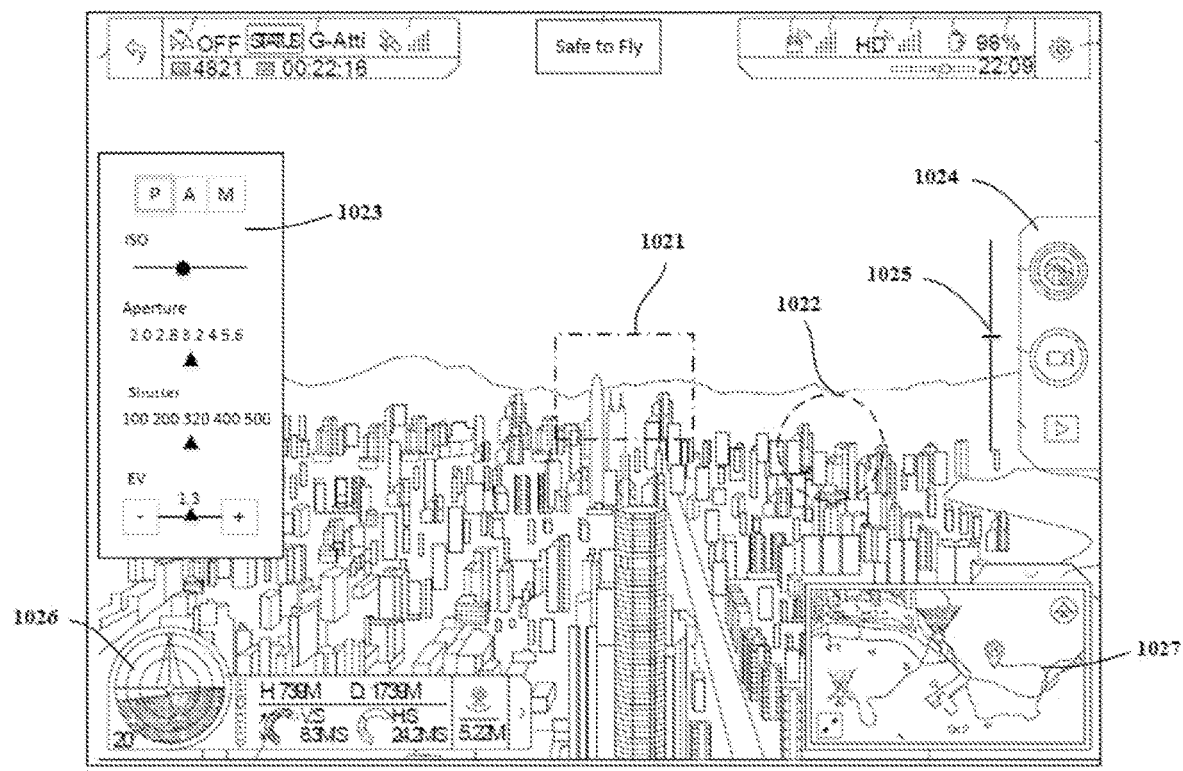
FIG. 1C shows an interactive interface on a control apparatus in accordance with an embodiment of the disclosure.
Figure 1D:
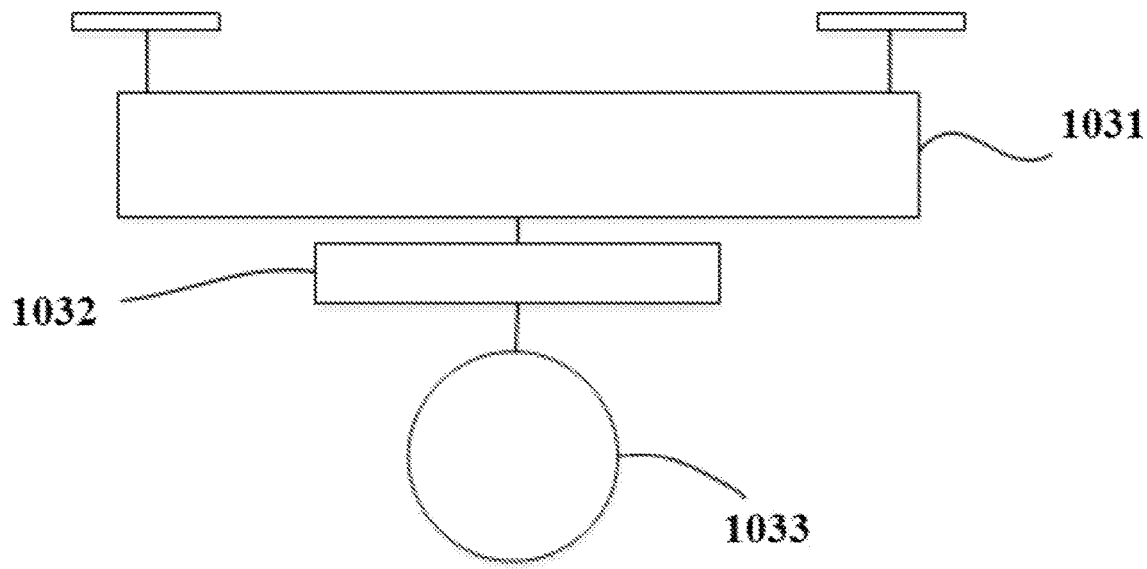
FIG. 1D shows a configuration of an imaging apparatus carried by an aerial vehicle in accordance with an embodiment of the disclosure.

On basis of the embodiment shown in FIG. 1A, FIG. 1C shows a first alternative embodiment of the disclosure. The control apparatus can comprise an interactive interface which is displayed over an image of a target imaging area. The interactive interface can comprise a focus icon and a light metering icon, both of which are functional icons displayed on the interactive interface.

As shown in FIG. 1C, a dashed line rectangle illustrated as 1021 can be the focus icon, a dashed line rectangle illustrated as 1022 can be the light metering icon, and an area illustrated as 1023 can be a mode selection area including P mode, A mode and M mode. Each of an ISO sensitivity value, an aperture value, a shutter value and an exposure value (EV) can be individually adjusted by a scrollbar. A detailed description will be omitted for conciseness.

In addition, a control icon for controlling an imaging, a video recording and a playback of the camera can be illustrated as 1024. A control icon for controlling an attitude of the gimbal can be illustrated as 1025. A display icon for displaying an attitude and a state of the UAV can be illustrated as 1026. A map icon for displaying a position of the UAV and an orientation of the camera can be illustrated as 1027. The information shown on the interactive interface can be helpful to a user in finding a view.

On basis of the first alternative embodiment, the disclosure provides a second alternative embodiment. The method of the second alternative embodiment of the disclosure can comprise, subsequent to the control apparatus acquiring an image of a target imaging area from the movable device and prior to the control apparatus sending to the movable device a first instruction carrying the imaging parameter, the control apparatus detecting a first touching signal indicating a user operating a non-icon area of the interactive interface, and the control apparatus simultaneously moving the focus icon and the light metering icon to a first stopping position on the interactive interface according to the first touching signal. In some instances, the light metering icon can be a spot light metering icon. It will be appreciated that, in an initial state, a default light metering can be a global light metering or a global light metering centering the light metering icon.

In some embodiments, the control apparatus adjusting an imaging parameter with respect to the target imaging area can comprise the control apparatus performing a focusing operation and a light metering operation to an area on the image which corresponds to the first stopping position, to obtain a focus parameter and an exposure parameter.

In some embodiments, the control apparatus sending a first instruction carrying the adjusted imaging parameter to the movable device can comprise the control apparatus sending to the movable device a first instruction carrying the focus parameter and the exposure parameter, such that the movable device can capture an image of the target imaging area according to the first instruction.

On basis of the second alternative embodiment, the disclosure provides a third alternative embodiment. In the method of the third alternative embodiment of the disclosure, the control apparatus obtaining the first stopping position of the focus icon and the light metering icon and performing a focusing operation and a light metering operation to an area on the image which corresponds to the first stopping position can comprise, when the focus icon is a manual focus icon and the light metering icon is a spot light metering icon corresponding to an automatic exposure function, the control apparatus performing a manual focus processing to an area on the image which corresponds to the manual focus icon and performing a spot light metering operation to an area on the image which corresponds to the spot light metering icon, to obtain the first focus parameter and the first exposure parameter.

In some embodiments, the control apparatus sending a first instruction carrying the adjusted imaging parameter to the movable device can comprise the control apparatus sending to the movable device a first instruction carrying the first focus parameter and the first exposure parameter, such that the movable device can capture an image of the target imaging area according to the first instruction.

On basis of the second alternative embodiment, the disclosure provides a fourth alternative embodiment. In the method of the fourth alternative embodiment of the disclosure, the control apparatus obtaining the first stopping position of the focus icon and the light metering icon and performing a focusing operation and a light metering operation to an area on the image which corresponds to the first stopping position can comprise, when the focus icon is an automatic focus icon and the light metering icon is a spot light metering icon corresponding to an automatic exposure function, the control apparatus performing an automatic focusing operation to an area on the image which corresponds to the automatic focus icon and performing a spot light metering operation to an area which corresponds to the spot light metering icon, to obtain a second focus parameter and a second exposure parameter.

In some embodiments, the control apparatus sending a first instruction carrying the adjusted imaging parameter to the movable device can comprise the control apparatus sending a first instruction carrying the second focus parameter and the second exposure parameter to the movable device, such that the movable device can capture an image of the target imaging area according to the first instruction.

On basis of the second alternative embodiment, the disclosure provides a fifth alternative embodiment. In the method of the fifth alternative embodiment of the disclosure, the control apparatus obtaining the first stopping position of the focus icon and the light metering icon and performing a focusing operation and a light metering operation to an area on the image which corresponds to the first stopping position can comprise: when the focus icon is an automatic focus lock icon and the light metering icon is a spot light metering icon corresponding to automatic exposure lock-on function, maintaining a position of the automatic focus icon and a position of the spot light metering icon on the interactive interface unchanged; and the control apparatus performing an automatic focusing operation to an area on the image which corresponds to the automatic focus lock icon and performing a spot light metering operation to an area on the image which corresponds to the spot light metering icon, to obtain a third focus parameter and a third exposure parameter.

In some embodiments, the control apparatus sending a first instruction carrying the adjusted imaging parameter to the movable device can comprise the control apparatus sending a first instruction carrying the third focus parameter and the third exposure parameter to the movable device, such that the movable device can capture an image of the target imaging area according to the first instruction.

On basis of any one of the embodiment shown in FIG. 1A and the first to fifth alternative embodiments, the disclosure provides a sixth alternative embodiment. In the sixth alternative embodiment of the disclosure, the control apparatus can comprise an interactive interface. The method can comprise, subsequent to the control apparatus acquiring an image of a target imaging area from the movable device and prior to the control apparatus sending to the movable device a first instruction carrying the imaging parameter, the control apparatus detecting a second touching signal indicating a user operating a focus icon on the interactive interface.

In some embodiments, the control apparatus adjusting an imaging parameter with respect to the target imaging area can comprise the control apparatus performing a focusing operation to the target imaging area according to the second touching signal.

On basis of the sixth alternative embodiment, the disclosure provides a seventh alternative embodiment. In the seventh alternative embodiment of the disclosure, when the focus icon is an automatic focus icon, the method can further comprise the control apparatus switching the automatic focus icon to an automatic focus lock icon.

In some embodiments, the control apparatus performing a focusing operation to the target imaging area according to the second touching signal can comprise the control apparatus performing an automatic focusing operation to an area on the image which corresponds to the automatic focus lock icon according to the second touching signal.

In some embodiments, when the focus icon is a manual focus icon, a state of the manual focus icon can be maintained unchanged. In some instances, the control apparatus performing a focusing operation to the target imaging area according to the second touching signal can comprise the control apparatus performing a manual focusing operation to an area on the image which corresponds to the manual focus icon according to the second touching signal, magnifying the area on the image which corresponds to the manual focus icon, and determining whether the area on the image which corresponds to the manual focus icon is in focus as a result of the manual focusing operation.

On basis of any one of the embodiment shown in FIG. 1A and the first to seventh alternative embodiments, the disclosure provides an eighth alternative embodiment. In the method of the eighth alternative embodiment of the disclosure, the control apparatus can comprise an interactive interface. In some embodiments, subsequent to the control apparatus acquiring an image of a target imaging area from the movable device and prior to the control apparatus sending to the movable device a first instruction carrying the imaging parameter, the method can comprise the control apparatus detecting a third touching signal indicating a user operating a light metering icon on the interactive interface.

In some embodiments, the control apparatus adjusting an imaging parameter with respect to the target imaging area can comprise the control apparatus performing a light metering operation to the target imaging area according to the third touching signal, to obtain a fourth exposure parameter.

In some embodiments, the control apparatus sending a first instruction carrying the adjusted imaging parameter to the movable device can comprise the control apparatus sending a first instruction carrying the fourth exposure parameter to the movable device, such that the movable device can capture an image of the target imaging area according to the first instruction.

On basis of the eighth alternative embodiment, the disclosure provides a ninth alternative embodiment. In the method of the ninth alternative embodiment of the disclosure, the control apparatus performing a light metering operation to the target imaging area according to the third touching signal can comprise, when the light metering icon is a spot light metering icon, the control apparatus locking the spot light metering icon to enable an automatic exposure lock function and performing a spot light metering operation to an area on the image which corresponds to the spot light metering icon according to the third touching signal; when the light metering icon is a locked spot light metering icon, the control apparatus unlocking the locked spot light metering icon to switch to the spot light metering icon, and performing a spot light metering operation to an area on the image which corresponds to the spot light metering icon according to the third touching signal; and when the light metering icon is a global light metering icon, the control apparatus performing a global light metering operation to an area on the image which corresponds to the global light metering icon according to the third touching signal.

On basis of any one of the embodiment shown in FIG. 1A and the first to ninth alternative embodiments, the disclosure provides an tenth alternative embodiment. In the tenth alternative embodiment of the disclosure, the control apparatus can comprise an interactive interface. In some embodiments, subsequent to the control apparatus acquiring an image of a target imaging area from the movable device and prior to the control apparatus sending to the movable device a first instruction carrying the imaging parameter, the method can comprise the control apparatus detecting a first sliding signal indicating a user operating a focus icon on the interactive interface, the focus icon including a manual focus icon and an automatic focus icon.

In some embodiments, the control apparatus adjusting an imaging parameter with respect to the target imaging area can comprise the control apparatus moving the focus icon on the interactive interface according to the first sliding signal to obtain a third stopping position, and performing a focusing operation to an area on the image which corresponds to the third stopping position to obtain a fourth focus parameter.

In some embodiments, the control apparatus sending a first instruction carrying the adjusted imaging parameter to the movable device can comprise the control apparatus sending a first instruction carrying the fourth focus parameter to the movable device, such that the movable device can capture an image of the target imaging area according to the first instruction.

With this alternative embodiment, a switch between a manual focus and an automatic focus can be effected, such that an operator can flexibly control a focusing and experience an intelligent operation.

On basis of the tenth alternative embodiment, the disclosure provides an eleventh alternative embodiment. In the eleventh alternative embodiment of the disclosure, performing a focusing operation to an area on the image which corresponds to the third stopping position can comprise: when the focus icon is an automatic focus icon, the control apparatus performing an automatic focusing operation to an area on the image which corresponds to the third stopping position, the fourth focus parameter being an automatic focus parameter; and when the focus icon is a manual focus icon, the control apparatus performing a manual focusing operation to an area on the image which corresponds to the third stopping position, the fourth focus parameter being a manual parameter.

On basis of any one of the embodiment shown in FIG. 1A and the first to eleventh alternative embodiments, the disclosure provides a twelfth alternative embodiment. In the twelfth alternative embodiment of the disclosure, the control apparatus can comprise an interactive interface. In some instances, subsequent to the control apparatus acquiring an image of a target imaging area from the movable device and before the control apparatus sending to the movable device a first instruction carrying the imaging parameter, the method can comprise the control apparatus detecting a second sliding signal indicating a user operating a light metering icon on the interactive interface.

In some embodiments, the control apparatus adjusting an imaging parameter with respect to the target imaging area can comprise the control apparatus moving the light metering icon on the interactive interface according to the second sliding signal to obtain a fourth stopping position, and performing a light metering operation to an area on the image which corresponds to the fourth stopping position to obtain a fifth focus parameter.

In some embodiments, the control apparatus sending a first instruction carrying the adjusted imaging parameter to the movable device can comprise the control apparatus sending a first instruction carrying the fifth focus parameter to the movable device, such that the movable device can capture an image of the target imaging area according to the first instruction.

On basis of the twelfth alternative embodiment, the disclosure provides a thirteenth alternative embodiment. In the thirteenth alternative embodiment of the disclosure, performing a light metering operation to an area on the image which corresponds to the fourth stopping position can comprise: when the light metering icon is a spot light metering icon, the control apparatus performing a spot light metering operation to an area on the image which corresponds to the third stopping position; and when the light metering icon is a global light metering icon, the control apparatus performing a global light metering operation to an area on the image which corresponding to the fourth stopping position.

On basis of any one of the embodiment shown in FIG. 1A and the first to thirteenth alternative embodiments, the disclosure provides a fourteenth alternative embodiment. In the fourteenth alternative embodiment of the disclosure, subsequent to the control apparatus acquiring an image of a target imaging area from the movable device and prior to the control apparatus adjusting an imaging parameter with respect to the target imaging area, the method can comprise the control apparatus detecting a fourth touching signal indicating a user operating a manual focus icon on the interactive interface, and switching the manual focus icon to the automatic focus icon according to the fourth touching signal; or, control apparatus detecting a fifth touching signal indicating a user operating an automatic focus icon on the interactive interface, and switching the automatic focus icon to the manual focus icon according to the fifth touching signal.

On basis of any one of the embodiment shown in FIG. 1A and the first to fourteenth alternative embodiments, the disclosure provides a fifteenth alternative embodiment. In the fifteenth alternative embodiment of the disclosure, subsequent to the control apparatus acquiring an image of a target imaging area from the movable device and prior to the control apparatus adjusting an imaging parameter with respect to the target imaging area, the method can comprise the control apparatus detecting a sixth touching signal indicating a user operating an automatic exposure lock icon on the interactive interface, locking the spot light metering icon according to the sixth touching signal to enable an automatic exposure lock-on function, and enabling the automatic exposure lock icon on the interactive interface.

On basis of any one of the embodiment shown in FIG. 1A and the first to fourteenth alternative embodiments, the disclosure provides a sixteenth alternative embodiment. In the sixteenth alternative embodiment of the disclosure, subsequent to the control apparatus acquiring an image of a target imaging area from the movable device and prior to the control apparatus adjusting an imaging parameter with respect to the target imaging area, the method can comprise the control apparatus detecting a seventh touching signal indicating a user operating an automatic exposure lock icon on the interactive interface, switching the spot light metering icon to the automatic exposure lock icon according to the seventh touching signal, and unlocking the automatic exposure lock icon on the interactive interface.

On basis of any one of the embodiment shown in FIG. 1A and the first to sixteenth alternative embodiments, the disclosure provides a seventeenth alternative embodiment. In the seventeenth alternative embodiment of the disclosure, subsequent to the control apparatus acquiring an image of a target imaging area from the movable device and prior to the control apparatus adjusting an imaging parameter with respect to the target imaging area, the method can comprise: the control apparatus detecting an eighth touching signal indicating a user operating an automatic focus lock general icon on the interactive interface, unlocking the manual focus icon according to the eighth touching signal; and locking the automatic focus icon on the interactive interface according to the eighth touching signal to enable the automatic focus lock icon.

On basis of any one of the embodiment shown in FIG. 1A and the first to seventeenth alternative embodiments, the disclosure provides an eighteenth alternative embodiment. In the eighteenth alternative embodiment of the disclosure, the interactive interface can comprise a movable device control icon. The control apparatus can detect a ninth touching signal indicating a user operating the movable device control icon and adjust an attitude of the movable device to acquire an updated image of the target area from the movable device.

In some embodiments, the control apparatus can adjust an imaging parameter with respect to the target imaging area, or maintain all or some the imaging parameters unchanged.

In some embodiments, the control apparatus can send to the movable device a second instruction carrying the adjusted imaging parameter, such that the movable device can capture an image of the target imaging area according to the second instruction.

With the method of the embodiments of the disclosure, a manual focus and a light metering of the camera carried on the aircraft can be remotely controlled by radio. A focusing operation and a light metering operation can be performed to an image. An optical zooming of the aircraft can be remotely controlled. Furthermore, imaging parameters can be conveniently adjusted using a remote controller or an intelligent terminal. A fast switch between various shooting modes can be effected. A focusing and a light metering can be simultaneously performed with a touch screen interaction. Therefore, the photographers can enjoy an improved operating experience, improved imaging quality and the desired effects.

Figure 2A:
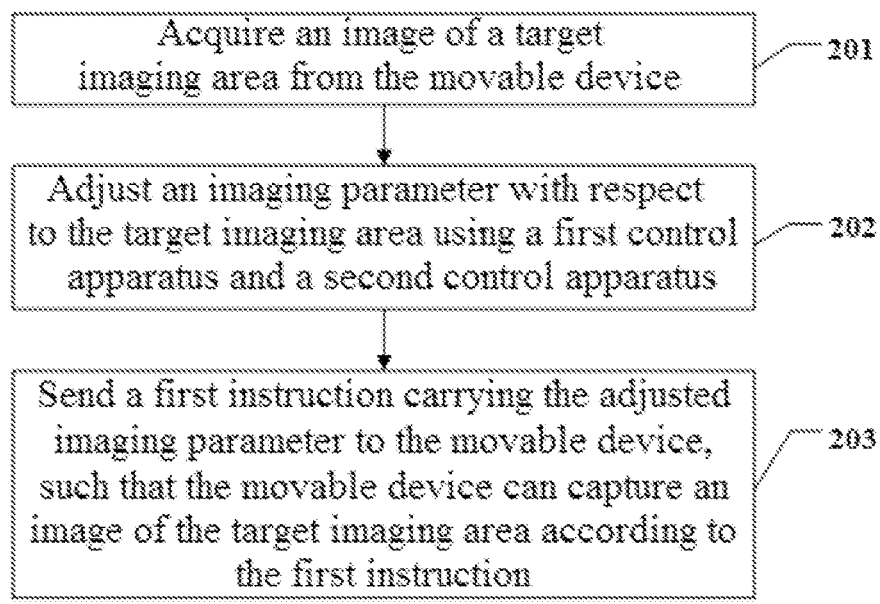
FIG. 2A shows a flowchart of a method for controlling an image capture of a movable device in accordance with an embodiment of the disclosure.
Figure 2B:
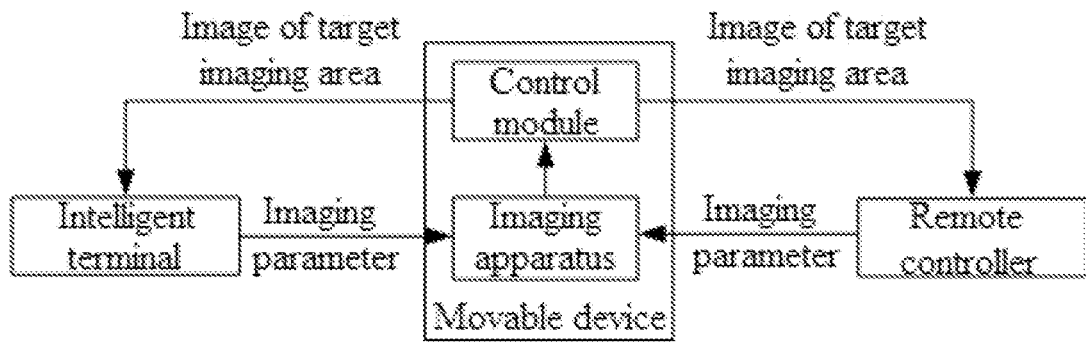
FIG. 2B shows a flowchart of a method for controlling an image capture of a movable device using an intelligent terminal and a remote controller in accordance with an embodiment of the disclosure.

The disclosure further provides a method for collectively controlling an image capture of a movable device using two control apparatuses. For instance, a method for collectively controlling an image capture of a UAV using a remote controller and an intelligent terminal. With reference to FIG. 2A and FIG. 2B, a method for controlling an image capture of a movable device in accordance with an embodiment of the disclosure can comprise steps 201 to 203.

In step 201, an image of a target imaging area can be acquired from the movable device.

In step 202, an imaging parameter with respect to the target imaging area can be adjusted using a first control apparatus and a second control apparatus.

In step 203, a first instruction carrying the adjusted imaging parameter can be sent to the movable device by the first control apparatus and/or the second control apparatus, such that the movable device can capture an image of the target imaging area according to the first instruction.

With the embodiment of the disclosure, an imaging parameter with respect to the target imaging area can be adjusted collectively using the first control apparatus and the second control apparatus, and then a first instruction carrying the adjusted imaging parameter can be sent to the movable device, such that a controlling of an image capture of the movable device can be effected.

On basis of the embodiment shown in FIG. 2A, the disclosure provides a first alternative embodiment. In the first alternative embodiment, the first control apparatus can comprise at least one of a dial, a joystick or a button. In some embodiments, the method can further comprise turning the dial to select a target adjustable mode, pressing the button to select a target adjustable mode, or operating the joystick to select a target adjustable mode.

On basis of the first alternative embodiment, the disclosure provides a second alternative embodiment. In the second alternative embodiment of the disclosure, the target adjustable mode can comprise one of a program control mode, an aperture priority mode, a shutter priority mode and a manual mode.

In some embodiments, the method can further comprise adjusting at least one of an ISO sensitivity value, a shutter value, an aperture value or an exposure value using the dial after the target adjustable mode is selected.

On basis of the first alternative embodiment, the disclosure provides a third alternative embodiment. In the third alternative embodiment of the disclosure, the target adjustable mode can be a manual focus mode. The method can further comprise, after selecting the manual focus mode, performing a focusing operation to the image by turning the dial, and/or performing a manual focusing operation by operating a first scrollbar or a first function menu on an interactive interface of the second control apparatus. The first scrollbar and the first function menu can correspond to a focus parameter.

On basis of the embodiment shown in FIG. 2A or the first alternative embodiment, the disclosure provides a fourth alternative embodiment. In the fourth alternative embodiment of the disclosure, the method can further comprise enabling at least one of a light metering operation, an automatic focusing operation or an a manual focusing operation by operating the dial, the joystick or the button; enabling a light metering operation and/or an automatic focusing operation by touching an interactive interface of the second control apparatus; enabling a light metering operation and/or a manual focusing operation by touching an interactive interface of the second control apparatus; enabling an automatic focusing operation or an automatic focusing lock operation by touching an interactive interface of the second control apparatus; enabling an automatic exposure operation or an automatic exposure lock operation by touching an interactive interface of the second control apparatus; or enabling a spot light metering operation or a global light metering operation by touching an interactive interface of the second control apparatus.

On basis of any of the embodiment shown in FIG. 2A and the first to fourth alternative embodiments, the disclosure provides a fifth alternative embodiment. In the fifth alternative embodiment of the disclosure, the method can further comprise pressing a button on the second control apparatus to switch a shooting mode; touching a second scrollbar on an interactive interface of the second control apparatus switching a shooting mode, the second scrollbar corresponding to an shooting mode; or touching a second function menu on an interactive interface of the second control apparatus to switch a shooting mode, the second function menu corresponding to an shooting mode. The shooting mode can comprise a program automatic mode, an aperture priority mode, a shutter priority mode and a manual mode.

On basis of the fourth or fifth alternative embodiment, the disclosure provides a sixth alternative embodiment. In the sixth alternative embodiment of the disclosure, when performing a manual focusing operation by operating a first scrollbar or a first function menu on an interactive interface of the second control apparatus, the method can further comprise: magnifying an area on the image to which the manual focusing operation is performed, and determining whether the area is in focus as a result of the manual focusing operation; and performing a focusing operation to the target imaging area by turning the dial and adjusting a light metering parameter on an interactive interface if the area is not in focus.

On basis of any of the embodiment shown FIG. 2A and the first to sixth alternative embodiments, the disclosure provides a seventh alternative embodiment with reference to FIGS. 1A and 2A, in the seventh alternative embodiment of the disclosure, the interactive interface can comprise a movable device control icon. An attitude of the movable device can be adjusted by the first control apparatus to acquire an updated image of the target imaging area from the movable device.

On basis of the seventh alternative embodiment, the disclosure provides an eighth alternative embodiment. In the eighth alternative embodiment of the disclosure, the first control apparatus and/or the second control apparatus can adjust an imaging parameter with respect to the target imaging area. A second instruction carrying the updated imaging parameter can be sent to the movable device by the first control apparatus and/or the second control apparatus, such that the movable device can capture an image of the target imaging area according to the second instruction.

On basis of the seventh alternative embodiment, the disclosure provides a ninth alternative embodiment. In the ninth alternative embodiment of the disclosure, all or some of the imaging parameters with respect to the target imaging area can be maintained unchanged by the first control apparatus and/or the second control apparatus. A second instruction carrying the updated imaging parameter can be sent to the movable device by the first control apparatus and/or the second control apparatus, such that the movable device can capture an image of the target imaging area according to the second instruction.

Figure 3A:
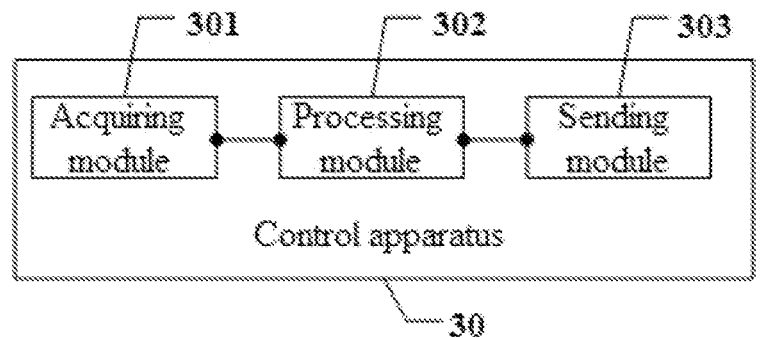
FIG. 3A shows a configuration of a control apparatus for controlling an image capture of a movable device in accordance with an embodiment of the disclosure.

The disclosure further provides a control apparatus for controlling an image capture of a movable device. With reference to FIG. 3A, the control apparatus 30 can comprise an acquiring module 301 configured to acquire an image of a target imaging area from the movable device; a processing module 302 configured to adjust an imaging parameter with respect to the target imaging area; a sending module 303 configured to send a first instruction carrying the adjusted imaging parameter to the movable device, such that the movable device can capture an image of the target imaging area according to the first instruction.

In some embodiments of the disclosure, subsequent to the processing module 302 adjusting the imaging parameter with respect to the target imaging area, the sending module 303 can send a first instruction carrying the adjusted imaging parameter to the movable device, such that the movable device can capture an image of the target imaging area according to the first instruction. Thereby, the imaging parameter of the imaging apparatus onboard the movable device can be remotely controlled and adjusted in real time in capturing an image.

On basis of the embodiment shown in FIG. 3A, in a first alternative embodiment of the disclosure, the control apparatus 30 can comprise an interactive interface as shown in FIG. 1C. The interactive interface can be displayed on an image of a target imaging area. The interactive interface can comprise a focus icon and a light metering icon, the focus icon and the light metering icon being functional icons on the interactive interface.

Figure 3B:
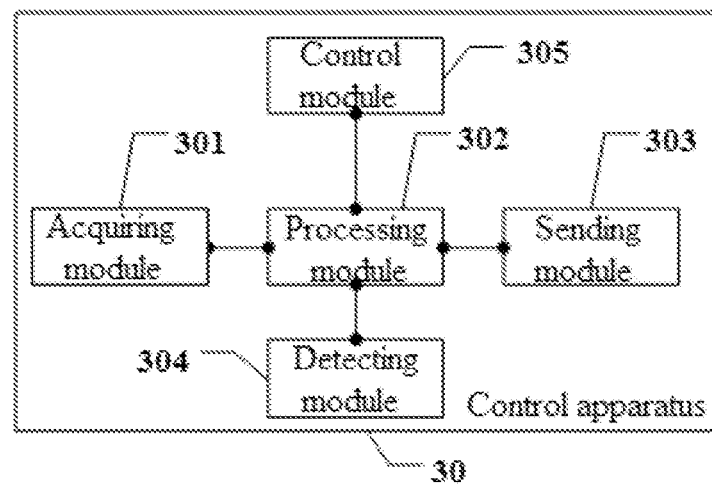
FIG. 3B shows a configuration of a control apparatus for controlling an image capture of a movable device in accordance with another embodiment of the disclosure.

On basis of the first alternative embodiment, in a second alternative embodiment of the disclosure as shown in FIG. 3B, the control apparatus 30 can further comprise a detecting module 304 configured to detect a first touching signal indicating a user operating a non-icon area on the interactive interface; a control module 305 configured to simultaneously move the focus icon and the light metering icon to a first stopping position on the interactive interface according to the first touching signal detected by the detecting module 304, the light metering icon being a spot light metering icon, and control the processing module 302 to perform a focusing operation and a light metering operation to an area on the image which corresponds to the first stopping position, to obtain a focus parameter and an exposure parameter.

In some embodiments, the sending module 303 can be configured to send the first instruction carrying the focus parameter and the exposure parameter to the movable device, such that the movable device can capture an image of the target imaging area according to the first instruction.

On basis of the second alternative embodiment, in a third alternative embodiment of the disclosure, the control module 305 can be configured to, when the focus icon is a manual focus icon and the light metering icon is a spot light metering icon corresponding to automatic exposure function, control the processing module 302 to perform manual focus processing to an area on the image which corresponds to the manual focus icon and perform a spot light metering operation to an area which corresponds to the spot light metering icon, to obtain a first focus parameter and a first exposure parameter.

In some embodiments, the sending module 303 can be configured to send the first instruction carrying the first focus parameter and the first exposure parameter to the movable device, such that the movable device can capture an image of the target imaging area according to the first instruction.

On basis of the second alternative embodiment, in a fourth alternative embodiment of the disclosure, the control module 305 can be configured to, when the focus icon is an automatic focus icon and the light metering icon is a spot light metering icon corresponding to an automatic exposure function, control the processing module 302 to perform an automatic focusing operation to an area on the image which corresponds to the automatic focus icon and perform a spot light metering operation to an area which corresponds to the spot light metering icon, to obtain a second focus parameter and a second exposure parameter.

In some embodiments, the sending module 303 can be configured to send the first instruction carrying the second focus parameter and the second exposure parameter to the movable device, such that the movable device can capture an image of the target imaging area according to the first instruction.

On basis the second alternative embodiment, in a fifth alternative embodiment of the disclosure, the control module 305 can be configured to, when the focus icon is an automatic focus lock icon and the light metering icon is a spot light metering icon corresponding to an automatic exposure lock-on function, maintain a position of the automatic focus icon and a position of the spot light metering icon on the interactive interface unchanged; and control the processing module 302 to perform an automatic focusing operation to an area on the image which corresponds to the automatic focus lock icon and performing a spot light metering operation to an area which corresponds to the spot light metering icon, to obtain a third focus parameter and a third exposure parameter.

In some embodiments, the sending module 303 can be configured to send a first instruction carrying the third focus parameter and the third exposure parameter to the movable device, such that the movable device can capture an image of the target imaging area according to the first instruction.

On basis of any of the second to the fifth alternative embodiments, in a sixth alternative embodiment of the disclosure, the control apparatus 30 can comprise an interactive interface, and the detecting module 304 can be further configured to detect a second touching signal indicating a user operating a focus icon on the interactive interface.

In some embodiments, the control module 305 can be configured to control the processing module 302 to perform a focusing operation to the target imaging area according to the second touching signal.

On basis of the sixth alternative embodiment, in a seventh alternative embodiment of the disclosure, when the focus icon is an automatic focus icon, the detecting module 304 can be further configured to switch the automatic focus icon to an automatic focus lock icon.

In some embodiments, the control module 304 can be further configured to control the processing module 302 to perform an automatic focusing operation to an area on the image which corresponds to the automatic focus lock icon according to the second touching signal.

When the focus icon is a manual focus icon, a state of the manual focus icon can be maintained unchanged. The control module can be further configured to control the control module 302 to perform a manual focusing operation to an area on the image which corresponds to the manual focus icon according to the second touching signal, magnify the area on the image which corresponds to the manual focus icon and determine whether the area on the image which corresponds to the manual focus icon is in focus as a result of the manual focusing operation.

On basis of any of the second to the seventh alternative embodiments, in an eighth alternative embodiment of the disclosure, the control apparatus 30 can comprise an interactive interface, and the detecting module 304 can be further configured to detect a third touching signal indicating a user operating a light metering icon on the interactive interface.

The control module 305 can be further configured to control the processing module 302 to perform a light metering operation to the target imaging area according to the third touching signal, to obtain a fourth exposure parameter.

The sending module 303 can be further configured to sending a first instruction carrying the fourth exposure parameter to the movable device, such that the movable device can capture an image of the target imaging area according to the first instruction.

On basis of the eighth alternative embodiment, in a ninth alternative embodiment of the disclosure, the control module 305 can be further configured to, when the light metering icon is a spot light metering icon, lock the spot light metering icon to enable automatic exposure lock function, and control the processing module 302 to perform a spot light metering operation to an area on the image which corresponds to the spot light metering icon according to the third touching signal; when the light metering icon is a locked spot light metering icon, unlock the locked spot light metering icon to switch to the spot light metering icon, and control the processing module 302 to perform a spot light metering operation to an area on the image which corresponds to the spot light metering icon according to the third touching signal; and when the light metering icon is a global light metering icon, control the processing module 302 to perform a global light metering operation to an area on the image which corresponds to the global light metering icon according to the third touching signal.

On basis of any of the second to the ninth alternative embodiments, in a tenth alternative embodiment of the disclosure, the detecting module 304 can be further configured to detect a first sliding signal indicating a user operating a focus icon on the interactive interface, the focus icon including a manual focus icon or an automatic focus icon.

The control module 305 can be further configured to control the processing module 302 to move the focus icon on the interactive interface according to the first sliding signal to obtain a third stopping position, and perform a focusing operation to an area on the image which corresponds to the third stopping position to obtain a fourth focus parameter.

The sending module 303 can be further configured to send the first instruction carrying the fourth focus parameter to the movable device, such that the movable device can capture an image of the target imaging area according to the first instruction.

On basis of the tenth alternative embodiment, in an eleventh alternative embodiment of the disclosure, the control module 305 can be further configured to, when the focus icon is an automatic focus icon, control the processing module 302 to perform an automatic focusing operation to an area on the image which corresponds to the third stopping position, the fourth focus parameter being an automatic focus parameter; and when the focus icon is a manual focus icon, control the processing module 302 to perform a manual focusing operation to an area on the image which corresponds to the third stopping position, the fourth focus parameter being a manual parameter.

On basis of any of the second to the eleventh alternative embodiments, in a twelfth alternative embodiment of the disclosure, the control apparatus 30 can comprise an interactive interface, and the detecting module 304 can be further configured to detect a second sliding signal indicating a user operating a light metering icon on the interactive interface.

The control module 305 can be further configured to control the processing module 302 to move the light metering icon on the interactive interface according to the second sliding signal to obtain a fourth stopping position, and perform a light metering operation to an area on the image which corresponds to the fourth stopping position to obtain a fifth focus parameter.

The sending module 303 can be further configured to send the first instruction carrying the fifth focus parameter to the movable device, such that the movable device can capture an image of the target imaging area according to the first instruction.

On basis of any of the second to twelfth alternative embodiments, in a thirteenth alternative embodiment of the disclosure, the control module 305 can be further configured to, when the light metering icon is a spot light metering icon, control the processing module 302 to perform a spot light metering operation to an area on the image which corresponds to the third stopping position; and when the light metering icon is a global light metering icon, control the processing module 302 to perform a global light metering operation to an area on the image which corresponds to the fourth stopping position.

On basis of any of the second to the thirteenth alternative embodiments, in a fourteenth alternative embodiment of the disclosure, the detecting module 304 can be further configured to detect a fourth touching signal indicating a user operating a manual focus icon on the interactive interface, and the control module 305 can be further configured to control the processing module 302 to switch the manual focus icon to the automatic focus icon according to the fourth touching signal detected by the detecting module. Alternatively, the detecting module 304 can be further configured to detect a fifth touching signal indicating a user operating an automatic focus icon on the interactive interface, and the control module 305 can be further configured to control the processing module 302 to switch the automatic focus icon to the manual focus icon according to the fifth touching signal detected by the detecting module.

On basis of any of the second to the fourteenth alternative embodiments, in a fifteenth alternative embodiment of the disclosure, the detecting module 304 can be further configured to detect a sixth touching signal indicating a user operating an automatic exposure lock icon on the interactive interface. The control module 305 can be further configured to control the processing module 302 to lock the spot light metering icon according to the sixth touching signal to enable an automatic exposure lock-on function, and enable an automatic exposure lock icon on the interactive interface.

On basis of any of the second to the fifteenth alternative embodiments, in a sixteenth alternative embodiment of the disclosure, the detecting module 304 can be further configured to detect a seventh touching signal indicating a user operating an automatic exposure lock icon on the interactive interface. The control module 305 can be further configured to control the processing module 302 to switch the spot light metering icon to an automatic exposure lock icon according to the seventh touching signal detected by the detecting module 304, and unlock the automatic exposure lock icon on the interactive interface.

On basis of any of the second to the sixteenth alternative embodiments, in a seventeenth alternative embodiment of the disclosure, the detecting module 304 can be further configured to detect an eighth touching signal indicating a user operating an automatic focus lock general icon on the interactive interface, and unlock the manual focus icon according to the eighth touching signal. The control module 305 can be further configured to lock an automatic focus icon on the interactive interface according to the eighth touching signal to enable the automatic focus lock icon.

On basis of any of the first to the seventeenth alternative embodiments, in an eighteenth alternative embodiment of the disclosure, the interactive interface can comprise a movable device control icon, and the control apparatus 305 can be further configured to detect a ninth touching signal indicating a user operating the movable device control icon and adjust an attitude of the movable device to acquire an updated image of a to-be-photographed sent from the movable device.

The control module 305 can be further configured to adjust an imaging parameter with respect to the target imaging area, or maintain all or some of the imaging parameter unchanged. The control module 305 can be further configured to send a second instruction carrying the adjusted imaging parameter to the movable device, such that the movable device can capture an image of the target imaging area according to the second instruction.

Figure 4A:
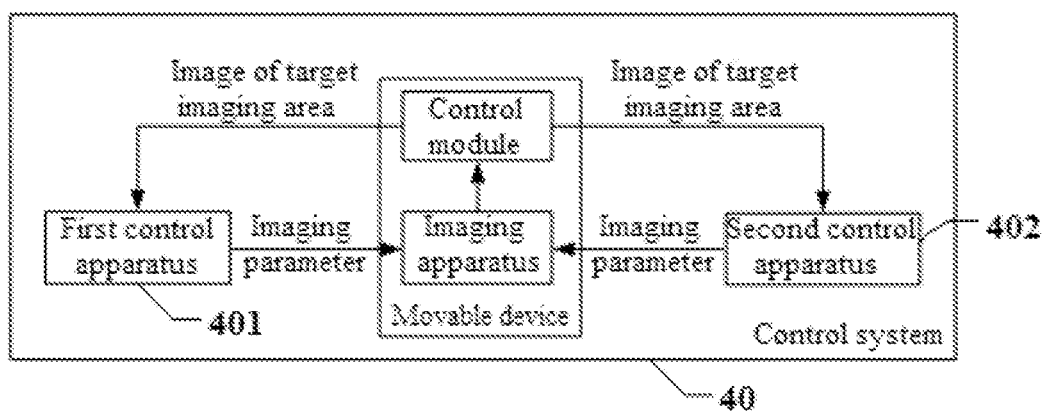
FIG. 4A shows a configuration of a control system for controlling an image capture of a movable device in accordance with an embodiment of the disclosure.
Figure 4B:
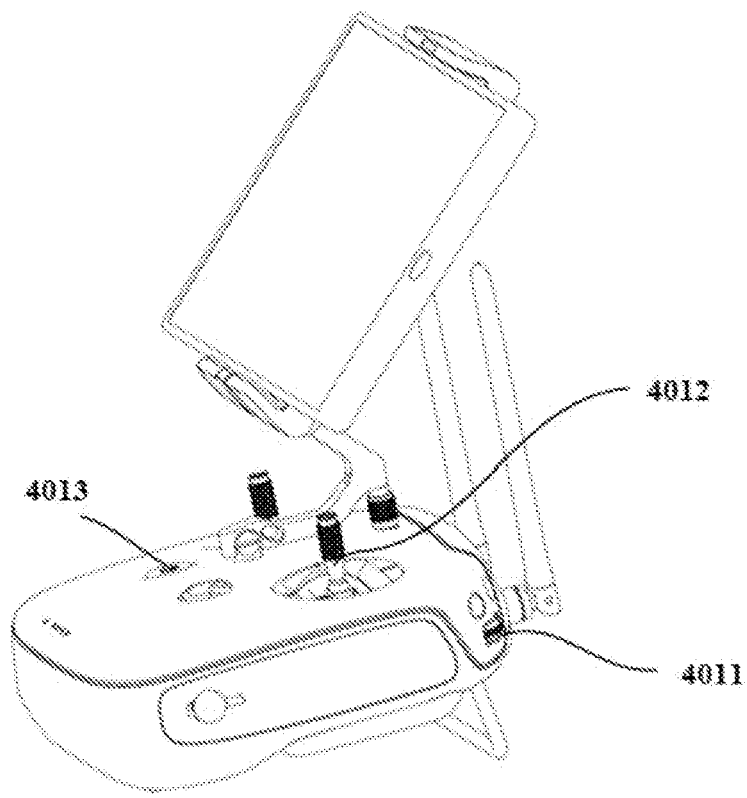
FIG. 4B shows a configuration of a first control apparatus in accordance with an embodiment of the disclosure.

A control system for controlling an image capture of a movable device in accordance with an embodiment of the disclosure will be illustrated where an image capture of the movable device can be controlled using an intelligent terminal and a remote controller. In some embodiments, a first control apparatus can be a remote controller of an unmanned aerial vehicle carrying a digital single-lens reflex camera, and a second control apparatus can be an intelligent terminal embedded with a control module or provided with a control software. The first and second control apparatuses are not limited in the disclosure. As shown in FIG. 4A, the control system 40 can comprise a first control apparatus 401 and a second control apparatus 402.

The first control apparatus 401 and the second control apparatus 402 can be configured to acquire an image of a target imaging area from the movable device. The first control apparatus 401 and the second control apparatus 402 can be configured to adjust an imaging parameter with respect to the target imaging area. The first control apparatus 401 and/or the second control apparatus 402 can be configured to send a first instruction carrying the updated imaging parameter to the movable device, such that the movable device can capture an image of the target imaging area according to the first instruction.

In embodiments of the disclosure, after the first control apparatus 401 and the second control apparatus 402 collectively adjusting an imaging parameter with respect to the target imaging area, a first instruction carrying the updated imaging parameter can be sent to the movable device, such that an image capture of the movable device can be controlled.

On basis of the embodiment shown in FIG. 4A, in a first alternative embodiment of the disclosure, as shown in FIG.

4B, the first control apparatus 401 can comprise at least one of a dial 4011, a joystick 4012 or a first button 4013.

In some embodiments, a target adjustable mode can be switched if the dial 4011 is turned. Alternatively, a target adjustable mode can be switched if the first button 4013 is pressed and the first control apparatus 401 receives a press instruction from the first button 4013. Alternatively, a target adjustable mode is switched if the joystick 4012 is operated. On basis of the first alternative embodiment, in a second alternative embodiment of the disclosure, the target adjustable mode can comprise one of a program control mode, an aperture priority mode, a shutter priority mode and a manual mode. After switching to the target adjustable mode, the dial 4011 can be turned to adjust at least one of an ISO sensitivity value, a shutter value, an aperture value and an exposure value.

Figure 4C:
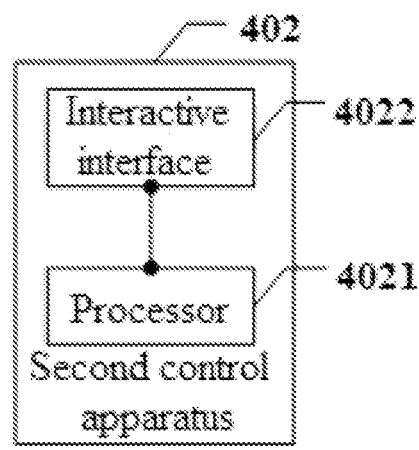
FIG. 4C shows a configuration of a second control apparatus in accordance with an embodiment of the disclosure.

On basis of the embodiment shown FIG. 4A, in a third alternative embodiment of the disclosure, as shown in FIG. 4C, the target adjustable mode can be a manual focus mode. The dial 4011 can be configured to, after selecting the manual focus mode, perform a focusing operation to the image by turning the dial 4011. Additionally and/or alternatively, the second control apparatus 402 can comprise a processor 4021 and an interactive interface 4022, the processor 4021 being configured to perform a manual focusing operation by operating a first scrollbar or a first function menu on an interactive interface of the second control apparatus 402, the first scrollbar and the first function menu corresponding to a focus parameter.

On basis of any of the first to third alternative embodiments, in a fourth alternative embodiment of the disclosure, the first control apparatus 401 can be configured to enable at least one of a light metering operation, an automatic focusing operation or a manual focusing operation by operating the dial 4011, the joystick 4012 or the first button 4013.

Alternatively, the second control apparatus 402 can comprise a processor 4021 and an interactive interface 4022. The processor 4021 can be configured to, according to a received touching signal with respect to the interactive interface, enable at least one of a light metering operation and/or an automatic focusing operation; a light metering operation and/or a manual focusing operation; an automatic focusing operation or an automatic focusing lock operation; an automatic exposure operation or an automatic exposure lock operation; or a spot light metering operation or a global light metering operation.

On basis of the fourth alternative embodiment, in a fifth alternative embodiment of the disclosure, the second control apparatus 402 can comprise a second button 4023, and the interactive interface 4022 can comprise a second scrollbar corresponding to an shooting mode and a second function menu corresponding to an shooting mode. The processor can be further configured to perform one of the following steps: switching an shooting mode by receiving a press instruction from the second button 4023; switching an shooting mode by detecting a touching signal with respect to the second scrollbar; and switching an shooting mode by detecting a touching signal with respect to the second function menu. The shooting mode can comprise a program automatic mode, an aperture priority mode, a shutter priority mode and a manual mode.

On basis of the fourth or fifth alternative embodiment, in a sixth alternative embodiment of the disclosure, the processor 4021 can be further configured to magnify an area on the image to which the manual focusing operation is performed, and determine whether the area is in focus as a result of the manual focusing operation; and perform a focusing operation to the target imaging area by turning the dial 4011, and adjust a light metering parameter on an interface if the area is not in focus.

On basis of any of the third to sixth alternative embodiments, in a seventh alternative embodiment of the disclosure, the interactive interface 4022 can comprise a movable device control icon. The first control apparatus 401 can be configured to adjust an attitude of the movable device to acquire an updated image of the target imaging area from the movable device. With embodiments of the disclosure, a new target image can be acquired when the movable device performs a next imaging process after completing the current one, and the entire imaging process can be controlled in real time.

On basis of the seventh alternative embodiment, in an eighth alternative embodiment of the disclosure, the first control apparatus 401 and/or the second control apparatus 402 can be configured to adjust an imaging parameter with respect to the target imaging area. The first control apparatus 401 and/or the second control apparatus 402 can be configured to send a second instruction carrying the adjusted imaging parameter to the movable device, such that the movable device can capture an image of the target imaging area according to the second instruction.

For example, a flight attitude of the movable device can be controlled using the joystick 4012, and a gimbal carried on the movable device can be controlled using the dial 4011, such that a imaging attitude of the imaging apparatus can be regulated.

On basis of the seventh alternative embodiment, in a ninth alternative embodiment of the disclosure, the first control apparatus 401 and/or the second control apparatus 402 can maintain all or some of the imaging parameters with respect to the target imaging area unchanged. A user can be enabled to adjust various photographing effects such that a user experience is improved. The first control apparatus 401 and/or the second control apparatus 402 can be configured to send a second instruction carrying the adjusted imaging parameter to the movable device, such that the movable device can capture an image of the target imaging area according to the second instruction.

It will be apparent that, details of the disclosures are described in various embodiments as discussed hereinabove. Some details of the disclosure may be omitted from the description of an embodiment, and reference can be made to a relevant description of other embodiments.

Those skilled in the art will appreciate that, a description of the system, apparatuses and units can be cleat with reference to a description of corresponding processes of the methods. A detailed description of the description of the system, apparatuses and units may be omitted in the disclosure for conciseness.

It will be appreciated that, the device and method disclosed in embodiments of the disclosure can be implemented in other manners. For instance, the described device embodiments are merely illustrative. For instance, a division of modules or units is merely a division based upon a logical function. Various divisions can be possible in actual implementation. For instance, multiple units or components can be combined or integrated on another system. For instance, some features can be ignored or not be performed. For instance, a mutual coupling, a direct coupling or a communication connection as shown or discussed can be an indirect coupling or a communication connection via an interface, a means or a unit. The coupling can be an electrical coupling or a mechanical coupling.

The units illustrated as separate parts may or may not be physically separated. The parts shown as units may or may not be physical units. For instance, the parts can be provided at the same location or distributed over a plurality of network units. All or some of the units can be selected to implement the embodiments of the disclosure according to actual requirements.

Various functional units in the embodiments of the disclosure may be integrated in one processing unit. The functional units can be separate and physical units. Two or more units may be integrated in one unit. The integrated units may be implemented as hardware or software functional units.

The integrated units, if implemented as software functional units and sold or used as independent products, may be stored in a computer-readable storage medium. With such an understanding, essentially the technical solution of the disclosure, or a part making contribution over the prior art, or all or part of the technical solution may be embodied as a software product. The computer software product is stored in a storage medium and includes several instructions for causing a computing device (e.g., personal computer, server, or network devices) to execute all or part of steps of the method according to the various embodiments of the disclosure. The above mentioned storage medium includes: various media capable of storing program code, such as a U disk, a removable hard disk, ROM (read-only memory), RAM (random access memory), a diskette, an optical disk, etc.

The disclosure provides a method, a control apparatus and a control system for controlling an image capture of a movable device. Illustrative embodiments are provided in the disclosure to describe principles of the disclosure, which embodiments are merely provided to illustrate the method of the disclosure. Any equivalent changes in embodiments and applications of the disclosure made in light of the spirit of the disclosure should all be encompassed in the scope of the disclosure.

What is claimed is:

1. A system for controlling image capture, comprising:
a control apparatus including:
a main body;
a dial located in a slot of a sidewall of the main body with a portion of the dial being exposed to be turned by a finger of a user, wherein the dial is exposed on a rear surface of the main body away from a front side of the main body, a distance between the dial and an edge formed by joining of the rear surface and a lateral surface of the main body is less than a distance between the dial and a center of the rear surface, and the front side of the main body faces the user during operation of the control apparatus;
a memory storing a computer program code; and
a processor configured to execute the computer program code to:
receive, from a movable device, an image of a target imaging area;
control a motion attitude of the movable device according to an operation on a joystick of the control apparatus by the user holding the control apparatus, the joystick being located on a top surface of the main body; and
adjust an attitude of a gimbal device configured on the movable device according to an operation on the dial configured on the control apparatus by the user while controlling the motion attitude of the movable device, the gimbal device carrying an imaging device for imaging the target imaging area.

2. The system of claim 1,
wherein the control apparatus is a first control apparatus, the memory is a first memory, the processor is a first processor, and the computer program code is a first computer program code;
the system further comprising:
a second control apparatus including:
an interactive interface;
a second memory storing a second computer program code; and
a second processor configured to execute the second computer program code to:
adjust one or more imaging parameters for imaging the target imaging area based at least in part on the image to obtain one or more adjusted imaging parameters, the interactive interface being configured to receive user interaction to control the attitude of the gimbal device.

3. The system of claim 2, wherein the interactive interface includes a gimbal control icon projected onto the image of the target imaging area, the gimbal control icon including a scrollbar and being configured to receive user interaction to control the attitude of the gimbal device.

4. The system of claim 1, wherein:
the control apparatus further includes a button; and
the processor of the control apparatus is further configured execute the computer program code to select a target adjustable mode in response to at least one of the dial being turned, the button being pressed, or the joystick being operated.

5. The system of claim 4, wherein:
the target adjustable mode includes one of a program control mode, an aperture priority mode, a shutter priority mode, and a manual mode; and
the processor of the control apparatus is further configured to execute the computer program code to, after the target adjustable mode is selected, adjust at least one of an ISO sensitivity value, a shutter value, an aperture value, or an exposure value in response to the dial being turned.

6. The system of claim 4,
wherein the control apparatus is a first control apparatus, the memory is a first memory, the processor is a first processor, and the computer program code is a first computer program code;
the system further comprising:
a second control apparatus including:
an interactive interface;
a second memory storing a second computer program code; and
a second processor;
wherein:
the target adjustable mode is a manual focus mode;
the first processor of the first control apparatus is further configured to execute the first computer program code to, after the manual focus mode is selected, perform a focusing operation on the image in response to the dial being turned; and
the second processor of the second apparatus is configured to execute the second computer program code to perform the focusing operation in response to an operation on a scrollbar or a function menu in the interactive interface of the second control apparatus that corresponds to a focus parameter.

7. The system of claim 6, wherein the second processor of the second control apparatus is further configured to:
magnify an area in the image on which the focusing operation is performed;
determine whether the area is in focus as a result of the focusing operation; and
in response to the area being not in focus:
continue the focusing operation on the target imaging area according to the dial being turned; and
adjust a light metering parameter according to an operation on the interactive interface.

8. The system of claim 1,
wherein the control apparatus is a first control apparatus, the memory is a first memory, the processor is a first processor, and the computer program code is a first computer program code;
the system further comprising:
a second control apparatus including:
an interactive interface;
a second memory storing a second computer program code; and
a second processor;
wherein:
the first processor of the first control apparatus is further configured to execute the first computer program code to enable at least one of a light metering operation, an automatic focusing operation, or a manual focusing operation in response to an operation on the first control apparatus; or
the second processor of the second control apparatus is configured to execute the second computer program code to, according to a received touching signal with respect to the interactive interface, enable at least one of:
the light metering operation and/or the automatic focusing operation;
the light metering operation and/or the manual focusing operation;
the automatic focusing operation or an automatic focusing lock operation;
an automatic exposure operation or an automatic exposure lock operation; or
a spot light metering operation or a global light metering operation.

9. The system of claim 1,
wherein the control apparatus is a first control apparatus, the memory is a first memory, the processor is a first processor, and the computer program code is a first computer program code;
the system further comprising:
a second control apparatus including:
an interactive interface;
a button;
a second memory storing a second computer program code; and
a second processor;
wherein:
the interactive interface of the second control apparatus is configured to display a scrollbar corresponding to shooting modes and a function menu corresponding to the shooting modes;
the shooting modes include a program automatic mode, an aperture priority mode, a shutter priority mode, and a manual mode; and the second processor of the second control apparatus is configured to execute the second computer program code to switch among the shooting modes in response to at least one of:
the button being pressed,
the scrollbar being touched, or
the function menu being touched.

10. The system of claim 1, further comprising:
an interactive interface, the interactive interface being above and oblique to the top surface of the main body during operation of the control apparatus.

11. The system of claim 1, wherein one or more antennas are disposed on the rear surface of the main body, and the dial is closer to the lateral surface of the main body than the one or more antennas.

12. A method for controlling image capture, comprising:
receiving, from a movable device, an image of a target imaging area;
controlling a motion attitude of the movable device according to an operation on a joystick of a control apparatus by a user holding the control apparatus, the joystick being located on a top surface of the control apparatus;
adjusting an attitude of a gimbal device configured on the movable device according to an operation on a dial configured on the control apparatus by the user while controlling the motion attitude of the movable device, the gimbal device carrying an imaging device for imaging the target imaging area, the dial being located in a slot of a sidewall of the control apparatus with a portion of the dial being exposed to be turned by a finger of the user, the dial being exposed on a rear surface of the control apparatus away from a front side of the control apparatus, a distance between the dial and an edge formed by joining of the rear surface and a lateral surface of the control apparatus being less than a distance between the dial and a center of the rear surface, the front side of the control apparatus facing the user during operation of the control apparatus.

13. The method of claim 12,
wherein the control apparatus is a first control apparatus;
the method further comprising:
adjusting, by operating on an interactive interface of a second control apparatus, one or more imaging parameters for imaging the target imaging area based at least in part on the image to obtain one or more adjusted imaging parameters, the interactive interface being configured to receive user interaction to control the attitude of the gimbal device.

14. The method of claim 13, wherein the interactive interface includes a gimbal control icon projected onto the image of the target imaging area, the gimbal control icon including a scrollbar and being configured to receive user interaction to control the attitude of the gimbal device.

15. The method of claim 12,
wherein the control apparatus further includes a button, the method further comprising:
selecting a target adjustable mode in response to at least one of the dial being turned, the button being pressed, or the joystick being operated.

16. The method of claim 15,
wherein the target adjustable mode includes one of a program control mode, an aperture priority mode, a shutter priority mode, and a manual mode,
the method further comprising, after selecting the target adjustable mode:

adjusting at least one of an ISO sensitivity value, a shutter value, an aperture value, or an exposure value in response to the dial being turned.

17. The method of claim 15,
wherein the target adjustable mode is a manual focus mode, the control apparatus is a first control apparatus,
the method further comprising, after selecting the manual focus mode:
  performing a focusing operation on the image in response to the dial being turned, and/or
  performing the focusing operation in response to an operation on a scrollbar or a function menu in an interactive interface of a second control apparatus that corresponds to a focus parameter.

18. The method of claim 17, wherein performing the focusing operation in response to the operation on the scrollbar or the function menu in the interactive interface of the second control apparatus includes:
  magnifying an area in the image on which the focusing operation is performed;
  determining whether the area is in focus as a result of the focusing operation; and
  in response to the area being not in focus:
    continuing the focusing operation on the target imaging area according to the dial being turned; and
    adjusting a light metering parameter according to an operation on the interactive interface.

19. The method of claim 12,
wherein the control apparatus is a first control apparatus, the method further comprising performing at least one of:
  enabling at least one of a light metering operation, an automatic focusing operation, or a manual focusing operation in response to an operation on the first control apparatus;
  enabling the light metering operation and/or the automatic focusing operation in response to a touch on an interactive interface of a second control apparatus;
  enabling the light metering operation and/or the manual focusing operation in response to a touch on the interactive interface of the second control apparatus;
  enabling the automatic focusing operation or an automatic focusing lock operation in response to a touch on the interactive interface of the second control apparatus;
  enabling an automatic exposure operation or an automatic exposure lock operation in response to a touch on the interactive interface of the second control apparatus; or
  enabling a spot light metering operation or a global light metering operation in response to a touch on the interactive interface of the second control apparatus.

20. The method of claim 12,
wherein the control apparatus is a first control apparatus, the method further comprising:
  switching among a plurality of shooting modes in response to at least one of:
    a button on a second control apparatus being pressed,
    a scrollbar in an interactive interface of the second control apparatus that corresponds to the shooting modes being touched, or
    a function menu in the interactive interface of the second control apparatus that corresponds to the shooting modes being touched,
  wherein the shooting modes include a program automatic mode, an aperture priority mode, a shutter priority mode, and a manual mode.

* * * * *